(12) United States Patent
Urasawa

(10) Patent No.: US 8,434,145 B2
(45) Date of Patent: Apr. 30, 2013

(54) INFORMATION PROCESSING SYSTEM, INPUT APPARATUS, AND INFORMATION PROCESSING METHOD

(75) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 471 days.

(21) Appl. No.: 12/461,930

(22) Filed: Aug. 28, 2009

(65) Prior Publication Data

US 2010/0071059 A1 Mar. 18, 2010

(30) Foreign Application Priority Data

Sep. 12, 2008 (JP) ................. 2008-234246

(51) Int. Cl.
*H04L 29/06* (2006.01)
(52) U.S. Cl.
USPC ............. 726/19; 709/217; 709/226; 709/229
(58) Field of Classification Search ............. 726/19
See application file for complete search history.

(56) References Cited

U.S. PATENT DOCUMENTS

| | | | | |
|---|---|---|---|---|
| RE37,031 E | * | 1/2001 | Nishiwaki | 358/1.14 |
| 7,035,900 B2 | * | 4/2006 | Yamaguchi et al. | 709/205 |
| 2001/0016819 A1 | * | 8/2001 | Kolls | 705/1 |
| 2002/0062453 A1 | * | 5/2002 | Koga | 713/202 |
| 2002/0169986 A1 | * | 11/2002 | Lortz | 713/201 |
| 2003/0020949 A1 | * | 1/2003 | Goto | 358/1.15 |
| 2004/0190057 A1 | * | 9/2004 | Takahashi et al. | 358/1.15 |
| 2005/0108547 A1 | * | 5/2005 | Sakai | 713/182 |
| 2005/0243364 A1 | * | 11/2005 | Sakai | 358/1.15 |
| 2006/0064753 A1 | * | 3/2006 | Otake et al. | 726/19 |
| 2006/0099947 A1 | * | 5/2006 | Shozaki et al. | 455/435.1 |
| 2006/0224686 A1 | * | 10/2006 | Kitada | 709/209 |
| 2006/0226218 A1 | * | 10/2006 | Atobe et al. | 235/382 |
| 2008/0016582 A1 | * | 1/2008 | Morimoto | 726/28 |
| 2008/0060070 A1 | * | 3/2008 | Uno | 726/21 |
| 2008/0144071 A1 | * | 6/2008 | Uchikawa | 358/1.14 |
| 2008/0320390 A1 | * | 12/2008 | Semple et al. | 715/700 |

FOREIGN PATENT DOCUMENTS

| | | |
|---|---|---|
| JP | 08-032801 A | 2/1996 |
| JP | 2001-256022 A | 9/2001 |
| JP | 2004-185629 A | 7/2004 |
| JP | 2005-157571 A | 6/2005 |
| JP | 2006-085615 A | 3/2006 |
| JP | 2008-112397 A | 5/2008 |

OTHER PUBLICATIONS

Flynn et al., The Satchel system architecture: Mobile access to documents and services, Dec. 2000, Springer Netherlands Mobile Networks and Applications, vol. 5, pp. 243-258.*

* cited by examiner

*Primary Examiner* — Taghi Arani
*Assistant Examiner* — Kenneth Chang
(74) *Attorney, Agent, or Firm* — Rabin & Berdo, P.C.

(57) ABSTRACT

An information processing system uses an input apparatus to input user information. After authentication of the user information, the input apparatus-transmits control information to an information processing apparatus, indicating which functions of the information processing apparatus the user may use. The control information is independent of the particular method by which authentication is performed. Use of the information processing apparatus can accordingly be controlled by a variety of methods without requiring any user authentication capability to be provided in the information processing apparatus itself, and new authentication methods can be implemented without modification or replacement of existing information processing apparatus.

16 Claims, 25 Drawing Sheets

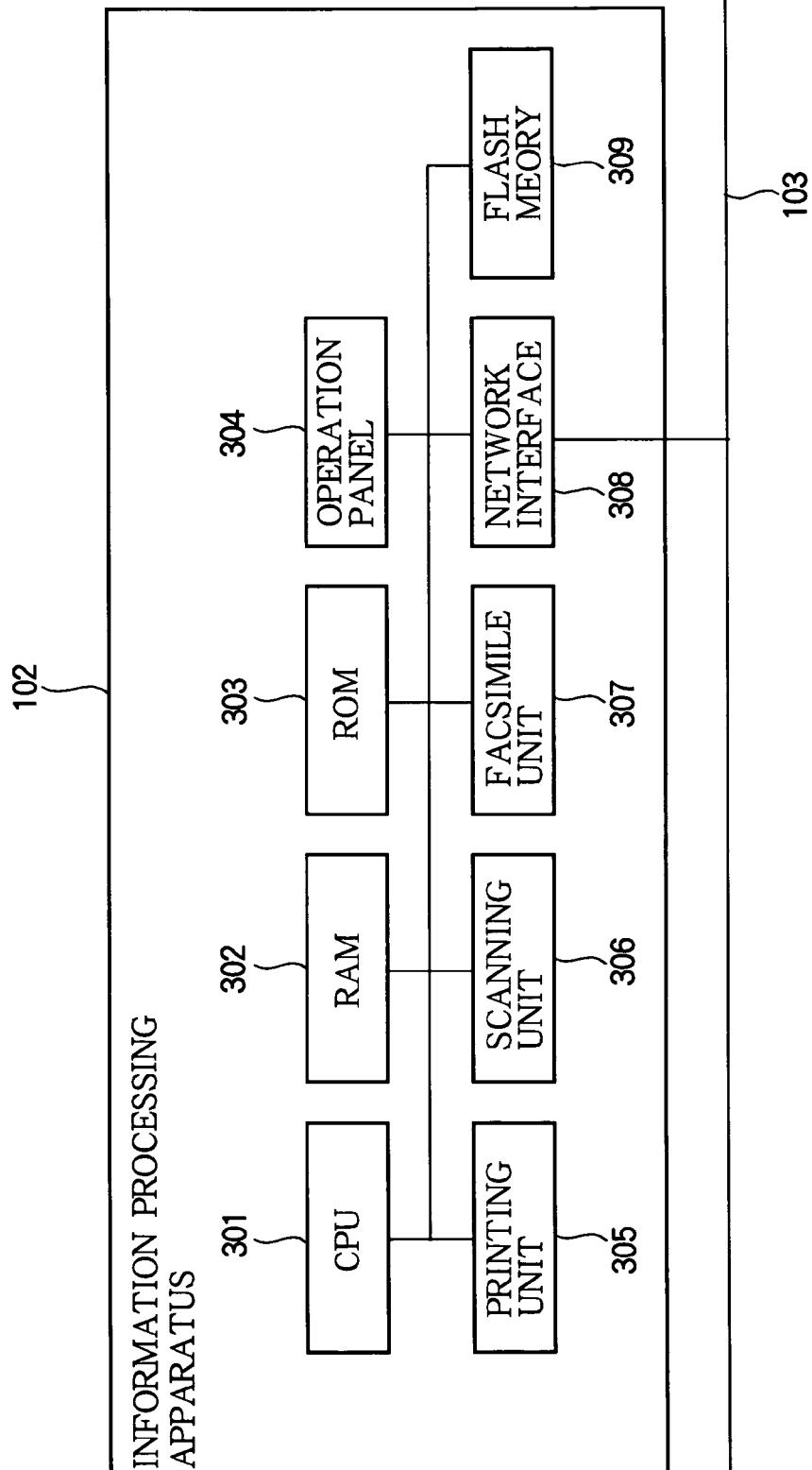

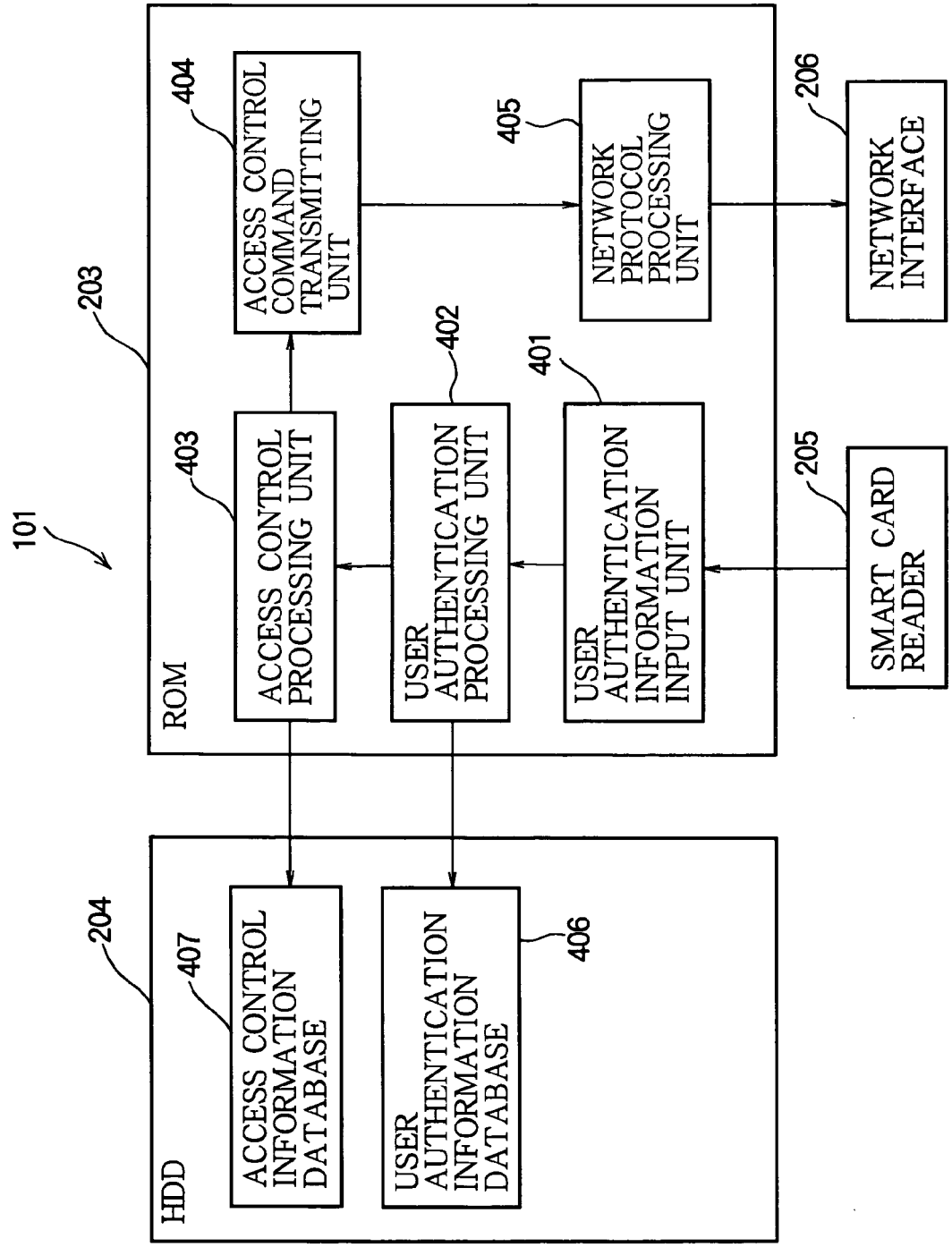

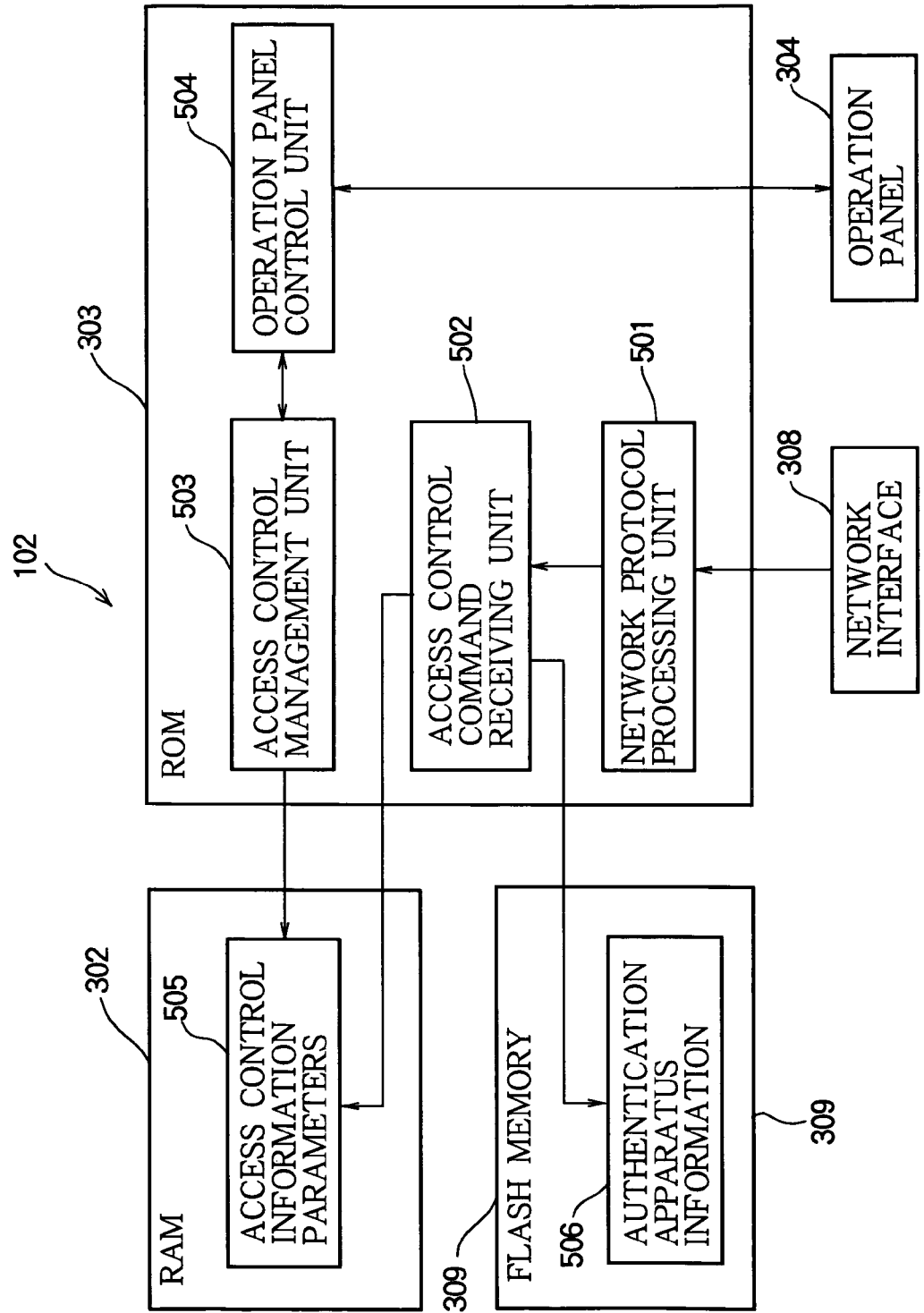

FIG. 6

USER AUTHNTICATION INFORMATION DATABASE

| USER AUTHNTICATION INFORMATION (SMART CARD SPECIFIC INFORMAION) | USER ID |
|---|---|
| 0 x 0 1 0 1 0 2 0 4 0 5 0 A 1 F 0 2 | 1 |
| 0 x 0 1 1 0 1 2 3 4 5 6 7 8 A B C D | 2 |
| 0 x 0 1 1 0 2 1 4 3 B A D C 6 5 8 7 | 3 |
| 0 x 0 1 0 1 F 1 E 2 D 3 C 4 B 5 A 6 | 4 |
| 0 x 0 1 0 1 0 2 0 4 0 5 0 A 0 0 A 8 | 5 |

FIG. 7

ACCESS CONTROL INFORMATION DATABASE

| USER ID | PRINT | SCAN | FAX | NETWORK |
|---|---|---|---|---|
| 1 | ON | ON | ON | ON |
| 2 | ON | ON | OFF | ON |
| 3 | OFF | ON | ON | OFF |
| 4 | OFF | ON | ON | ON |
| 5 | ON | OFF | OFF | OFF |

FIG. 8

ACCESS CONTROL COMMANDS

| MIB NAME | SETTING OPTIONS | MEANING |
|---|---|---|
| accessControlPrint | ENABLE/DISABLE | USE OF PRINTING FUNCTION ENABLED/DISABLED |
| accessControlScan | ENABLE/DISABLE | USE OF SCANNING FUNCTION ENABLED/DISABLED |
| accessControlFax | ENABLE/DISABLE | USE OF FACSIMILE FUNCTION ENABLED/DISABLED |
| accessControlNetwork | ENABLE/DISABLE | USE OF NETWORK FUNCTION ENABLED/DISABLED |
| accessControlPanel | ENABLE/DISABLE | USE OF PANEL FUNCTION ENABLED/DISABLED |

FIG. 9
ACCESS CONTROL COMMANDS

| MIB NAME | SETTING | MEANING |
|---|---|---|
| accessControlPrint | ENABLE | USE OF PRINTING FUNCTION ENABLED |
| accessControlScan | ENABLE | USE OF SCANNING FUNCTION ENABLED |
| accessControlFax | DISABLE | USE OF FACSIMILE FUNCTION DISABLED |
| accessControlNetwork | ENABLE | USE OF NETWORK FUNCTION ENABLED |
| accessControlPanel | ENABLE | USE OF PANEL FUNCTION ENABLED |

FIG. 10
ACCESS CONTROL INFORMATION PARAMETERS (AFTER ACCESS CONTROL COMMAND PROCESSING)

| PARAMETER ID | SETTING | MEANING |
|---|---|---|
| ACCESS_CONTROL_PRINT_ID | ENABLE | USE OF PRINTING FUNCTION ENABLED |
| ACCESS_CONTROL_SCAN_ID | ENABLE | USE OF SCANNING FUNCTION ENABLED |
| ACCESS_CONTROL_FAX_ID | DISABLE | USE OF FACSIMILE FUNCTION DISABLED |
| ACCESS_CONTROL_NETWORK_ID | ENABLE | USE OF NETWORK FUNCTION ENABLED |
| ACCESS_CONTROL_PANEL_ID | ENABLE | USE OF PANEL FUNCTION ENABLED |

FIG. 11
ACCESS CONTROL INFORMATION PARAMETERS (AFTTER LOGOUT)

| PARAMETER ID | SETTING | MEANING |
|---|---|---|
| ACCESS_CONTROL_PRINT_ID | DISABLE | USE OF PRINTING FUNCTION DISABLED |
| ACCESS_CONTROL_SCAN_ID | DISABLE | USE OF SCANNING FUNCTION DISABLED |
| ACCESS_CONTROL_FAX_ID | DISABLE | USE OF FACSIMILE FUNCTION DISABLED |
| ACCESS_CONTROL_NETWORK_ID | DISABLE | USE OF NETWORK FUNCTION DISABLED |
| ACCESS_CONTROL_PANEL_ID | DISABLE | USE OF PANEL FUNCTION DISABLED |

FIG.30

USER AUTHENTICATION INFORMATION DATABASE

| USER AUTHENTICATION INFORMATION (FINGERPRINT FEATURE INFORMATION) | USER ID |
|---|---|
| [FEATURE INFORMATION 1] | 101 |
| [FEATURE INFORMATION 2] | 102 |
| [FEATURE INFORMATION 3] | 103 |
| [FEATURE INFORMATION 4] | 104 |
| [FEATURE INFORMATION 5] | 105 |

FIG.31

ACCESS CONTROL INFORMATION DATABASE

| USER ID | PRINT | SCAN | FAX | NETWORK |
|---|---|---|---|---|
| 101 | ON | ON | ON | ON |
| 102 | ON | ON | OFF | ON |
| 103 | OFF | ON | ON | OFF |
| 104 | OFF | ON | ON | ON |
| 105 | ON | OFF | OFF | OFF |

FIG.32

ACCESS CONTROL INFORMATION
(SMART CARD AUTHENTICATION)

| PARAMETER ID | SETTING | MEANING |
|---|---|---|
| ACCESS_CONTROL_PRINT_ID | ENABLE | USE OF PRINTING FUNCTION ENABLED |
| ACCESS_CONTROL_SCAN_ID | DISABLE | USE OF SCANNING FUNCTION DISABLED |
| ACCESS_CONTROL_FAX_ID | DISABLE | USE OF FACSIMILE FUNCTION DISABLED |
| ACCESS_CONTROL_NETWORK_ID | DISABLE | USE OF NETWORK FUNCTION DISABLED |

FIG. 33

ACCESS CONTROL COMMANDS (SMART CARD AUTHENTICATION)

| MIB NAME | SETTING | MEANING |
|---|---|---|
| accessControlPrint | ENABLE | USE OF PRINTING FUNCTION ENABLED |
| accessControlScan | DISABLE | USE OF SCANNING FUNCTION DISABLED |
| accessControlFax | DISABLE | USE OF FACSIMILE FUNCTION DISABLED |
| accessControlNetwork | DISABLE | USE OF NETWORK FUNCTION DISABLED |
| accessControlPanel | ENABLE | USE OF PANEL FUNCTION ENABLED |

FIG. 34

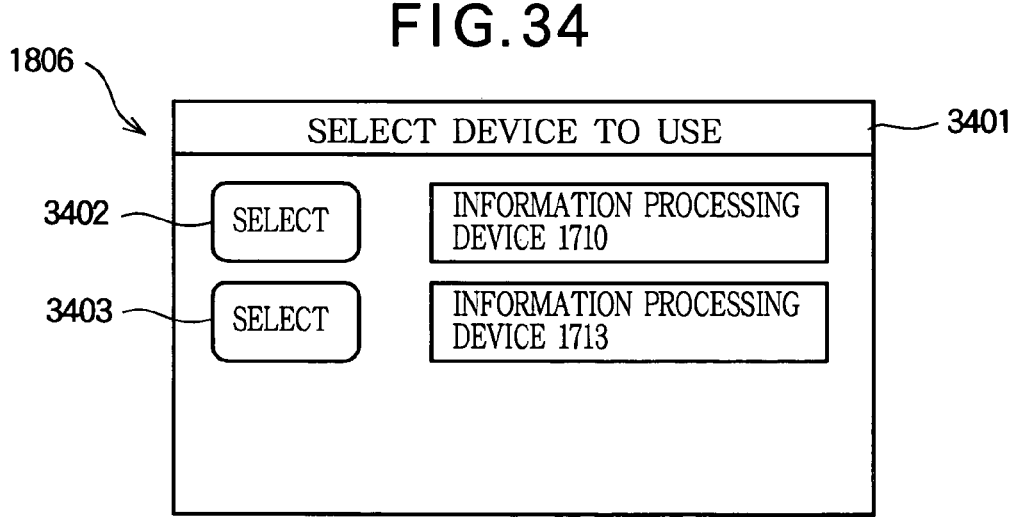

FIG. 35

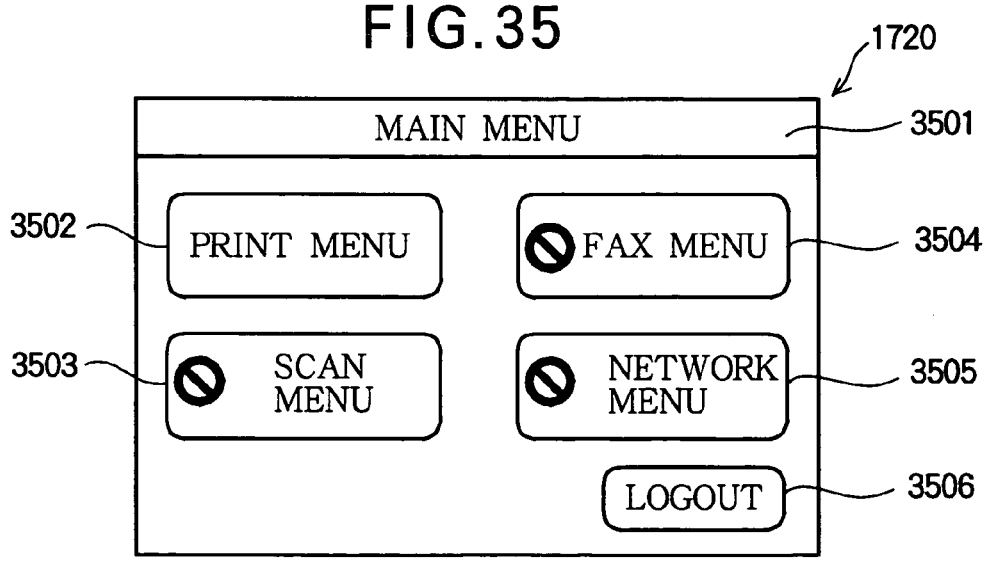

FIG.36

ACCESS CONTROL INFORMATION
(FINGERPRINT AUTHENTICATION)

| PARAMATER ID | SETTING | MEANING |
|---|---|---|
| ACCESS_CONTROL_PRINT_ID | DISABLE | USE OF PRINTING FUNCTION DISABLED |
| ACCESS_CONTROL_SCAN_ID | ENABLE | USE OF SCANNING FUNCTION ENABLED |
| ACCESS_CONTROL_FAX_ID | ENABLE | USE OF FACSIMILE FUNCTION ENABLED |
| ACCESS_CONTROL_NETWORK_ID | DISABLE | USE OF NETWORK FUNCTION DISABLED |

FIG.37

ACCESS CONTROL COMMAND (FINGERPRINT AUTHENTICATION)

| MIB NAME | SETTING OPTIONS | MEANING |
|---|---|---|
| accessControlPrint | DISABLE | USE OF PRINTING FUNCTION DISABLED |
| accessControlScan | ENABLE | USE OF SCANNING FUNCTION ENABLED |
| accessControlFax | ENABLE | USE OF FACSIMILE FUNCTION ENABLED |
| accessControlNetwork | DISABLE | USE OF NETWORK FUNCTION DISABLED |
| accessControlPanel | ENABLE | USE OF PANEL FUNCTION ENABLED |

INFORMATION PROCESSING SYSTEM, INPUT APPARATUS, AND INFORMATION PROCESSING METHOD

BACKGROUND OF THE INVENTION

1. Field of the Invention

The present invention relates to an information processing system, input apparatus, and information processing method for performing user authentication when processing information.

2. Description of the Related Art

Access control based on user authentication is carried out to prevent misuse of information processing apparatus such as printers, scanners, facsimile machines, and multifunction devices (e.g., copiers) that combine the functions of two or more of these types of apparatus. In conventional information processing apparatus, the information necessary for user authentication and access control is generally stored in the information processing apparatus, and user authentication and access control processing is generally carried out in the information processing apparatus itself. For one example, see paragraphs 0014-0017 and FIG. 1 in Japanese Patent Application Publication No. H8-32801.

A problem is that there are many methods of user authentication, some requiring special devices such as smart card readers or biometric coprocessors, and different authentication protocols are in use, such as the Lightweight Directory Access Protocol (LDAP) and Kerberos, to name just two. It is difficult to equip each piece of information processing apparatus to deal with the many authentication methods and protocols that it might be called on to employ.

SUMMARY OF THE INVENTION

An object of the present invention is to provide a more flexible way to control the use of information processing apparatus in an information processing system.

An information processing system according to the present invention includes an input apparatus and an information processing apparatus.

The input apparatus includes a user information input unit for input of user information, and a control information transmitting unit for transmitting control information based on available function information corresponding to the user information.

The information processing apparatus has functions for processing received information. The information processing apparatus also includes a control information receiving unit for receiving the control information transmitted by the input apparatus, and a function control unit for restricting use of the functions of the information processing apparatus according to the control information.

The input unit may also perform authentication processing on the user information. Alternatively, the information processing system may include an authentication server to which the input unit sends the user information for authentication. The available function information may be stored in the input apparatus or in the authentication server.

In this information processing system, the input apparatus, or the input apparatus and authentication server, can perform authentication by any method or protocol, after which the input apparatus can send the information processing apparatus control information that can be analyzed in the information processing apparatus regardless of the authentication method or protocol used. New authentication methods and protocols can handled flexibly without requiring modification of the information processing apparatus.

The invention also provides an input apparatus, connectable to an information processing apparatus, including an input unit for input of user information and a transmitting unit for transmitting control information to the information processing apparatus. The control information is based on available function information corresponding to the user information. The available function information indicates available functions of the information processing apparatus.

The input apparatus may also perform authentication processing on the user information, or may be connectable to an authentication server that performs authentication processing as described above.

The invention furthermore provides an information processing system including an input apparatus that inputs user information and an information processing apparatus that processes received information, in which the input apparatus includes a user information input unit for input of the user information, a processing information input unit for input of requested processing information, and an information transmitting unit for transmitting the user information and the requested processing information, and the information processing apparatus includes an information receiving unit for receiving the user information and the requested processing information, a data storage unit for storing a plurality of processing data, a data selecting unit for selecting the processing data from the data storage unit according to the user information and the requested processing information, and a data processor for processing the selected processing data.

This system enables different users to store data in the information processing unit and request processing of their own data via the input apparatus, without exposing their data to perusal or processing by other users.

BRIEF DESCRIPTION OF THE DRAWINGS

In the attached drawings:

FIG. 3 is a block diagram showing the main components of an information processing apparatus in the first embodiment;

FIG. 4 is a block diagram illustrating program units and databases and their interrelationships in the authentication apparatus in the first embodiment;

FIG. 5 is a block diagram illustrating program units, stored parameters and information, and their interrelationships in the information processing apparatus in the first embodiment;

FIG. 6 shows exemplary information stored in a user authentication information database in the first embodiment;

FIG. 7 shows exemplary information stored in an access control information database in the first embodiment;

FIG. 8 shows an exemplary access control command table used in the first embodiment;

FIG. 9 shows an exemplary table of information given by access control commands in the first embodiment;

FIG. 10 shows an exemplary table of accessible function information parameter IDs and enable/disable settings given by the access control commands in FIG. 9;

FIG. 11 shows a table of updated accessible function information parameter IDs and enable/disable settings after a logout button is pressed in the first embodiment;

FIG. 30 shows exemplary user authentication information stored in the user authentication information database in the fingerprint authentication server in the second embodiment;

FIG. 31 shows exemplary accessible function information stored in an accessible function information database in the fingerprint authentication server in the second embodiment;

FIG. 32 shows a table of accessible function information obtained by performing smart card authentication in the second embodiment;

FIG. 33 shows a table of access control commands obtained by performing smart card authentication in the second embodiment;

FIG. 34 shows an exemplary screen displayed on the operation panel for selecting usable information processing apparatus when smart card authentication is performed, in the second embodiment;

FIG. 35 shows an exemplary screen displayed on the operation panel when smart card authentication is performed and use of the panel function is enabled, after the access control commands are received in the second embodiment;

FIG. 36 shows a table of exemplary accessible function information obtained by performing fingerprint authentication in the second embodiment;

FIG. 37 shows a table of exemplary access control commands obtained by performing fingerprint authentication in the second embodiment;

DETAILED DESCRIPTION OF THE INVENTION

Figure 1:
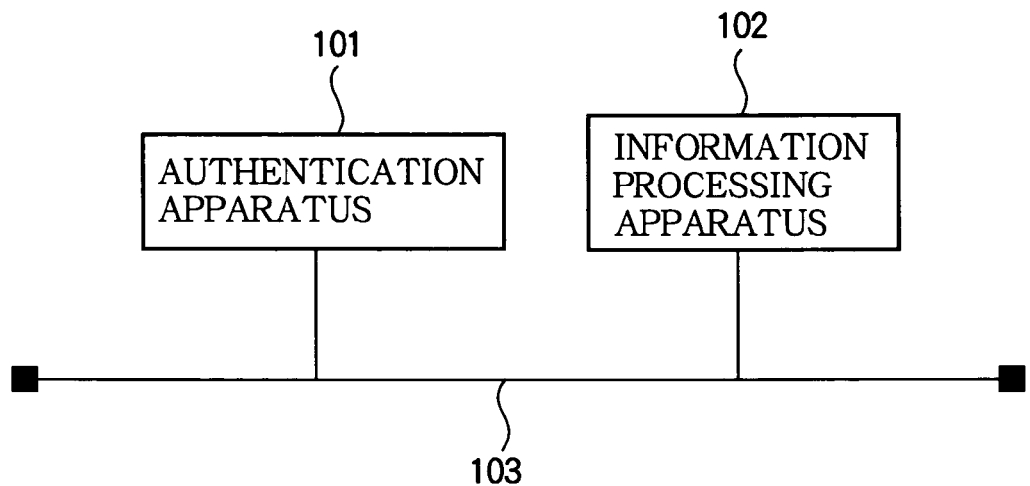
FIG. 1 is a block diagram showing the general configuration of an information processing system according to a first embodiment of the invention.

Embodiments of the invention will now be described with reference to the attached drawings, in which like elements are indicated by like reference characters.

First Embodiment

Referring to FIG. 1, the first embodiment is an information processing system comprising an authentication apparatus 101 and an information processing apparatus.

The authentication apparatus 101 includes a device such as a smart card reader for input of user authentication information, performs user authentication according to the input user authentication information, decides, according to the authenticated user information, what functions may be accessed, and sends access control commands based on the accessible functions to the information processing apparatus 102. The information processing apparatus 102, which is a device such as a multifunction printer (MFP) that provides various information processing functions, carries out access control of the accessible functions based on the access control commands. A network interconnects the authentication apparatus 101 to the information processing apparatus 102 by conventional methods.

Figure 2:
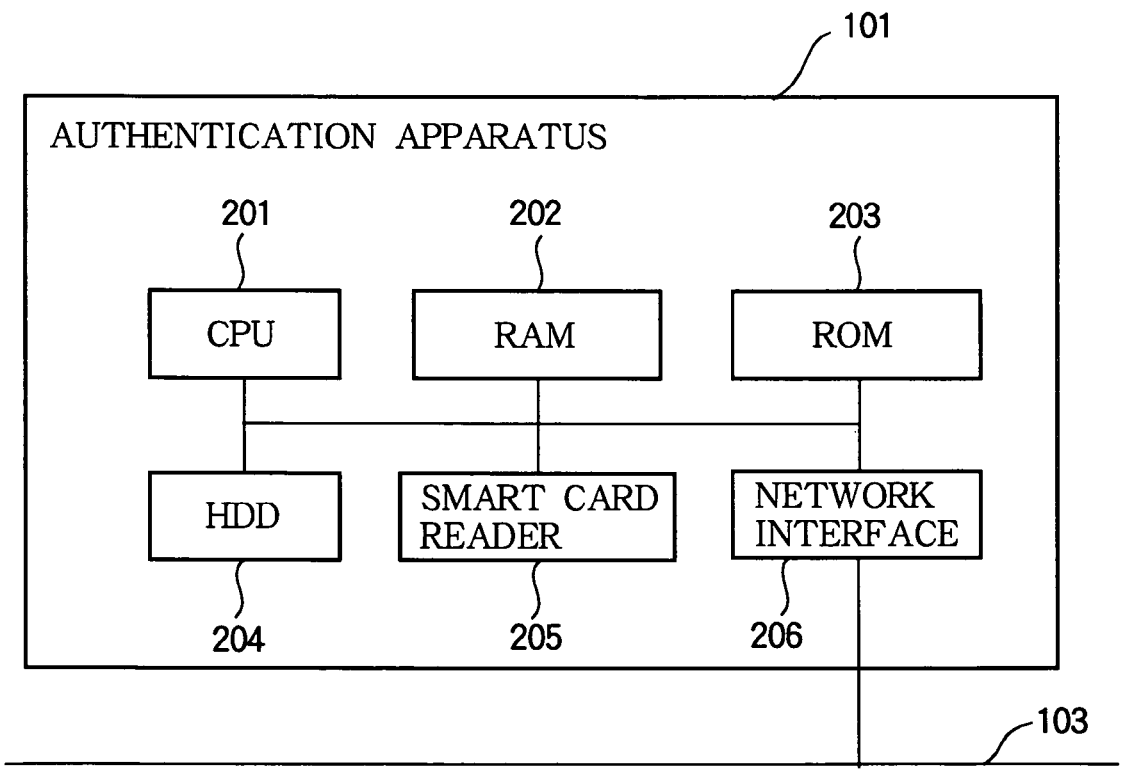
FIG. 2 is a block diagram showing the main components of an authentication apparatus in the first embodiment.

Referring to FIG. 2, the main components of the authentication apparatus 101 are a central processing unit (CPU) 201 for controlling the overall operation of the authentication apparatus 101, random-access memory (RAM) 202 for volatile storage of various information, read-only memory (ROM) 203 for storage of programs executed by the CPU 201, a hard disk drive (HDD) 204 for nonvolatile storage of various information, a smart card reader 205 for reading user authentication information from smart cards, and a network interface 206 for connecting the authentication apparatus 101 to the network 103.

Referring to FIG. 3, the main components of the information processing apparatus 102 are a CPU 301 for controlling the overall operation of the information processing apparatus 102, RAM 302 for volatile storage of various information, ROM 303 for storage of programs executed by the CPU 301, an operation panel 304 having a touch screen, a printing unit 305 for producing printed output by using a known printing method such as an electrophotographic method, a scanning unit 306 for reading image data by using a known optical scanning method, a facsimile unit 307 for transmitting and receiving image data via telephone lines by known methods, a network interface 308 for transmitting and receiving data via the network 103 by known methods, and a nonvolatile flash memory 309.

Referring to FIG. 4, the program units stored in the ROM 203 include a user authentication information input unit 401, a user authentication processing unit 402, an access control processing unit 403, an access control command transmitting unit 404, and a network protocol processing unit 405, and the information stored in the HDD 204 includes a user authentication information database 406 and an access control information database 407. In the authentication processing performed in the authentication apparatus 101, these program units and databases are related to each other and to the smart card reader 205 and network interface 206 as indicated by the arrows.

The user authentication information input unit 401 in FIG. 4 reads user authentication information from the smart card reader 205. In the first embodiment, the user authentication information is personal information individually assigned to and stored in a smart card. The user authentication processing unit 402, functioning as an authentication processor, searches the user authentication information database 406 according to the user authentication information read from the smart card reader 205 to decide whether the user is registered as an authorized user. The access control processing unit 403 searches the access control information database 407 according to authenticated user information, and decides what functions are accessible according to the authenticated user information.

The access control command transmitting unit 404 functions as a command generator by generating access control commands based on the accessible function information, and then transmits the generated access control commands via the network protocol processing unit 405. The network protocol processing unit 405 performs network communication by using a known network protocol. In this embodiment the network protocol processing unit 405 transmits the access control commands by using the simple network management protocol (SNMP).

Referring to FIG. 5, the programs stored in the ROM 303 include a network protocol processing unit 501, an access control command receiving unit 502, an access control management unit 503, and an operation panel control unit 504, the information stored in the RAM 302 includes access control information parameters 505, and the information stored in the flash memory 309 includes authentication apparatus information 506. In the information processing performed in the information processing apparatus 102, these program units, parameters, and information are related to each other and to the operation panel 304 and network interface 308 as indicated by the arrows.

The network protocol processing unit 501 performs network communication by using a known network protocol. In this embodiment the network protocol processing unit 501 uses SNMP to receive access control commands. When access control commands are received, the access control command receiving unit 502 sets the specified accessible function information in the access control information parameters 505 and, by comparing the authentication apparatus information 506 stored in the flash memory 309 with information about the authentication apparatus 101 that sent the access control commands, decides whether the access control commands have been received from an authentication apparatus 101 authorized to send access control commands.

The access control management unit 503 directs the operation panel control unit 504 to produce a panel display according to the access control information parameters 505, that is, the accessible function information specified by the present access control commands. The operation panel control unit 504 generates an operation panel menu at the direction of the access control management unit 503, and displays the operation panel menu on a screen on the operation panel 304.

In the present example, it will be assumed that the user authentication information database 406 and access control information database 407 store the information shown in FIGS. 6 and 7, respectively, and that the access control commands are as listed in FIG. 8.

Figure 12:
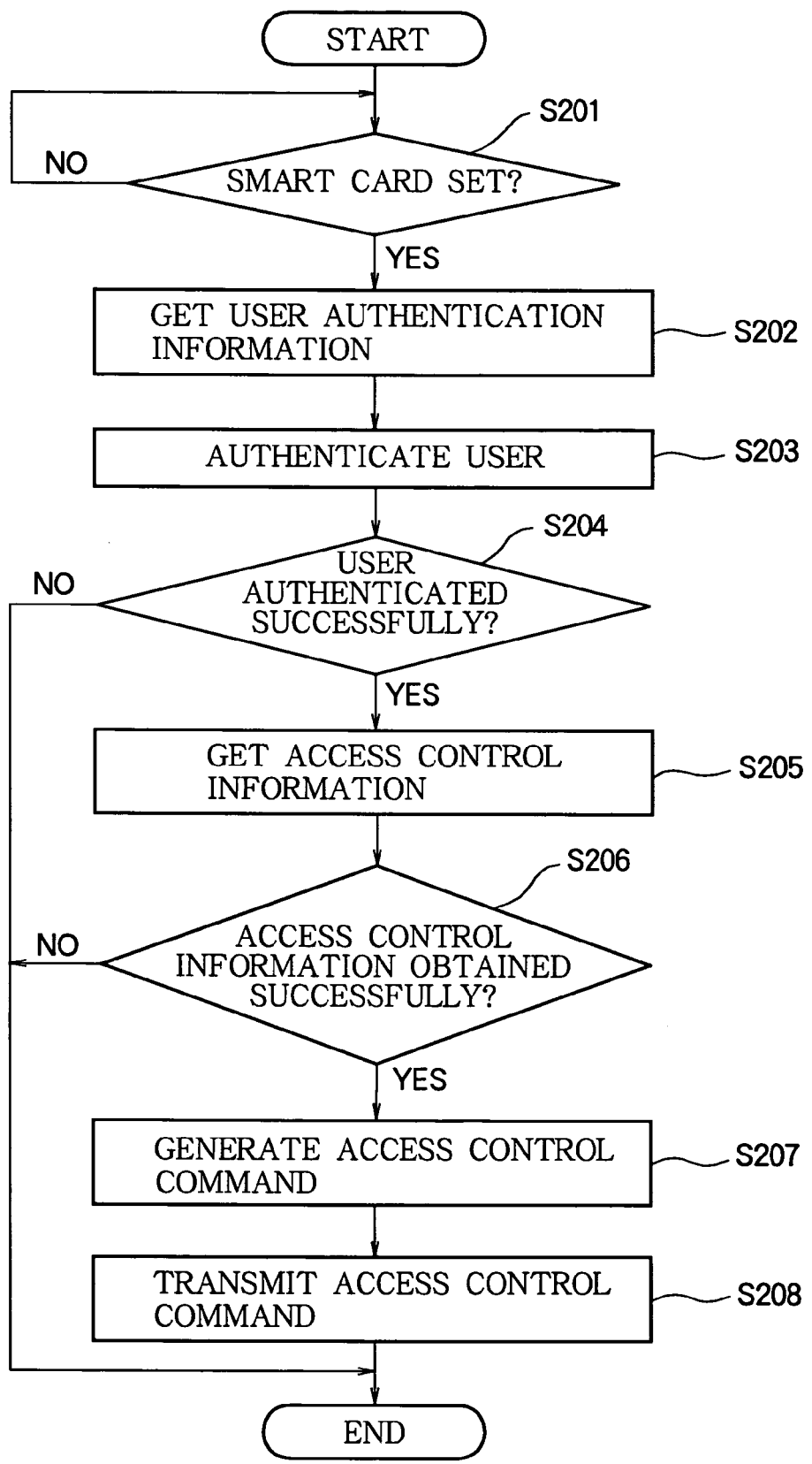
FIG. 12 is a flowchart illustrating the flow of authentication processing by the authentication apparatus in the first embodiment.
Figure 13:
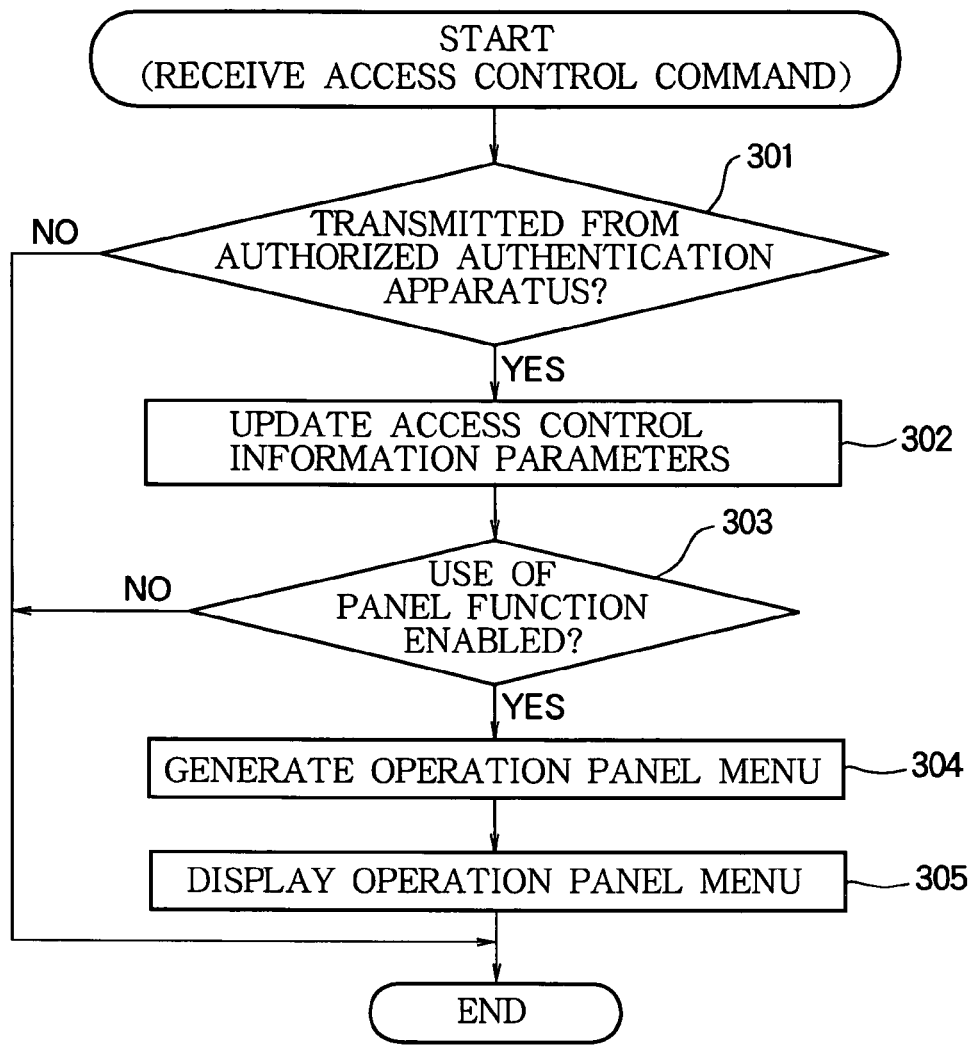
FIG. 13 is a flowchart illustrating the flow of information processing by the information processing apparatus in the first embodiment.
Figure 14:
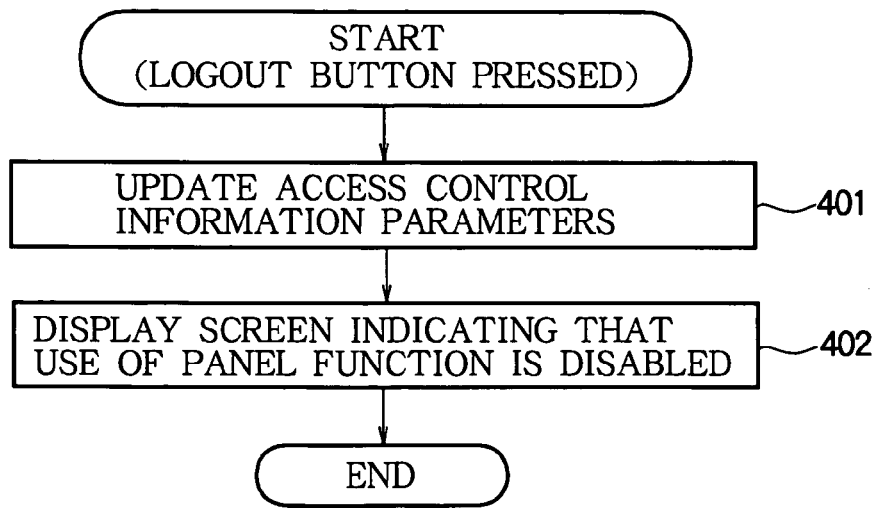
FIG. 14 is a flowchart illustrating the flow of operations when the logout button displayed on the screen on the operation panel is pressed in the first embodiment.

The flow of the operations performed by the information processing system in the first embodiment is illustrated in the flowcharts in FIGS. 12 to 14. These operations will now be explained through specific examples with reference to these flowcharts.

The flow of authentication processing by the authentication apparatus 101 is illustrated in FIG. 12. First, the operation of the authentication apparatus 101 will be explained with reference to FIGS. 2, 4, and 12.

The user authentication information input unit 401 regularly queries the smart card reader 205 to decide whether a smart card is set in the smart card reader 205 (step S201), and reads user authentication information if the user authentication information input unit 401 detects the setting of a smart card (step S202). In the first embodiment, the user authentication information is personal information individually assigned to and stored in a smart card as noted above. As an example, it will be assumed that the hexadecimal value 0x011012345678ABCD is read as user authentication information.

To perform user authentication, the user authentication processing unit 402 searches the user authentication information database 406 (FIG. 6) according to the user authentication information read from the smart card reader 205 (step S203). In this embodiment, the user authentication information 0x011012345678ABCD read from the smart card reader 205 is found in the second row in the table of information stored in the user authentication information database 406 shown in FIG. 6. Accordingly, user authentication succeeds and the user authentication processing unit 402 identifies the user as the user with the user ID '2' as user information (step S204, 'Yes'). If user authentication fails, the authentication processing ends (step S204, 'No').

Next, the access control processing unit 403 searches the access control information database 407 (FIG. 7) according to the authenticated user information to obtain accessible function information (step S205). In this embodiment, the accessible function information for the user with user ID '2' is found in the second row in FIG. 7, indicating 'ON' for the printing, scanning, and network (i.e., network access) functions, and 'OFF' for the facsimile function. Accordingly, the access control processing unit 403 succeeds in obtaining accessible function information (step S206, 'Yes'). If the access control processing unit 403 fails to obtain accessible function information, the authentication processing ends (step S206, 'No').

When accessible function information is obtained, the access control command transmitting unit 404 generates access control commands based on the accessible function information (step S207), and sends the access control commands via the network protocol processing unit 405 (step S208). In the present example, the access control commands give the management information base (MIB) names and enable/disable settings indicated in FIG. 9. In this embodiment, an additional panel access control command enabling use of the panel function is generated when the user authentication processing unit 402 succeeds in user authentication, and this access control command is sent in addition to the access control commands generated from the database information, as shown in the bottom line in FIG. 7.

The flow of information processing by the information processing apparatus 102 is illustrated in the flowchart in FIG. 13. Next, the operation of the information processing apparatus 102 will be explained with reference to FIGS. 3, 5, and 13.

When the access control commands shown in FIG. 9 are received, the network protocol processing unit 501 activates the access control command receiving unit 502. By comparing the authentication apparatus information 506 prestored in the flash memory 309 with information about the authentication apparatus 101 that sent the access control commands, the access control command receiving unit 502 decides whether the access control commands have been received from an authentication apparatus 101 authorized to send access control commands, and proceeds to the next step if the access control commands have been received from an authorized authentication apparatus 101 (step S301, 'Yes'), or halts processing of the access control commands and terminates the authentication process if the access control commands have been received from an unauthorized authentication apparatus 101 (step S301, 'No').

In this embodiment, media access control (MAC) addresses are used as the authentication apparatus information 506. Before any authentication takes place, an administrator starts up the information processing apparatus 102 in a mode that only the administrator can use and enters information about a plurality of authentication apparatuses as the authentication apparatus information 506 from the operation panel 304.

As described above, only access control commands received from an authentication apparatus with a MAC address that has been stored in the information processing apparatus 102 are processed; access control commands received from an authentication apparatus with a MAC address that has not been stored in the information processing apparatus 102 are discarded. This scheme improves security by avoiding unauthorized use of the information processing apparatus 102 with unauthorized access control commands.

In the next step, the access control command receiving unit 502 updates the access control information parameters 505 according to the accessible function information specified by the access control commands (step S302). In the present example, the access control commands give the accessible function information parameter IDs and enable/disable settings indicated in FIG. 10.

If use of the panel function is disabled (step S303, 'No'), the authentication processing ends. If use of the panel function is enabled according to the updated access control information parameters 505 (step S303, 'Yes'), the access control management unit 503 directs the operation panel control unit 504 to enable use of the panel function. The operation panel control unit 504 generates an operation panel menu according to the enable/disable settings of the access control information parameters 505 (step S304), and displays the operation panel menu on the screen on the operation panel 304 (step S305).

Figure 15:
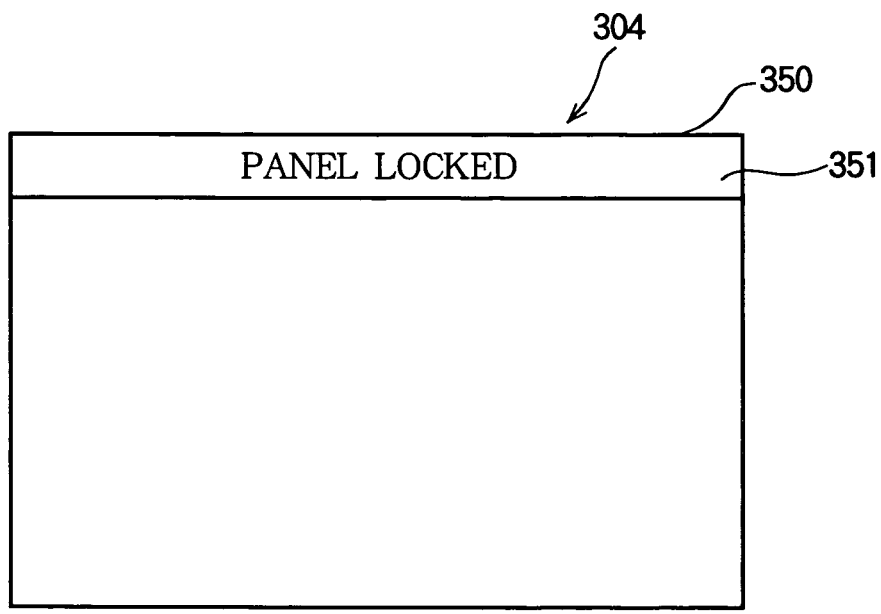
FIG. 15 shows an exemplary screen displayed on the operation panel when use of the panel function is disabled, before the information processing apparatus receives access control commands in the first embodiment.

Before the information processing apparatus 102 receives the access control commands, use of the panel function is disabled and the screen display 350 shown in FIG. 15, for example, is displayed on the operation panel 304. After the access control commands are received, if use of the panel function is enabled, the main menu 361 shown in FIG. 16, for example, is displayed on the operation panel 304. When use of the panel function is disabled, this is indicated by the 'panel locked' message 351 displayed on the screen display 350 in FIG. 15. When use of the panel function is enabled, the display panel 360 in FIG. 16 displays a main menu 361 indicating the accessible functions. In the present example, based on the access control information database 407 in FIG. 10, the main menu 361 includes a print menu button 362, scan menu button 363, network menu button 365, and logout button 366, the use of all of which is enabled, and a facsimile (fax) menu button 364, the use of which is disabled. Disabled functions are indicated by an appropriate icon.

If the user presses one of the usable buttons 362, 363, 365, the control unit (not shown) of the printing unit 305, scanning unit 306, or network interface 308 executes the relevant data processing function, by known methods which will not be described.

Figure 16:
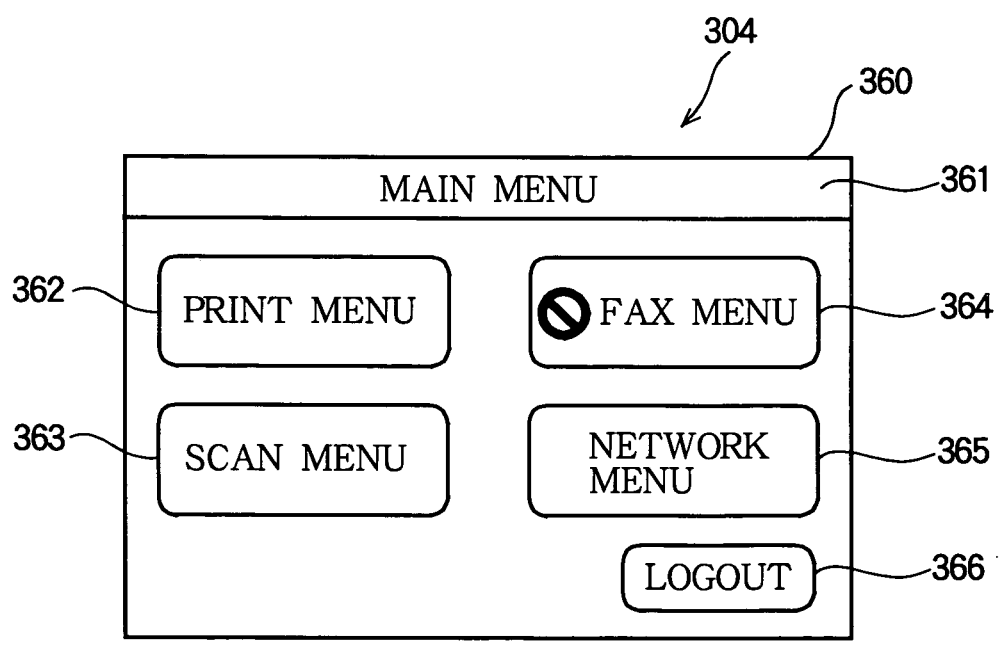
FIG. 16 shows an exemplary screen displayed on the operation panel when use of the panel function is enabled, after the access control commands are received in the first embodiment.

Next, the operation of the information processing apparatus 102 when the logout button 366 displayed on the display panel 360 on the operation panel 304 shown in FIG. 16 is pressed will be explained with reference to FIG. 5 and the flowchart in FIG. 14.

When the logout button 366 is pressed, the access control management unit 503 updates the access control information parameters 505 to disable use of the panel function (step S401). The updated accessible function information parameter IDs and enable/disable settings are indicated in FIG. 11. The access control management unit 503 also directs the operation panel control unit 504 to disable use of the panel function. The operation panel control unit 504 generates the screen display 350 shown in FIG. 15, for example, for display on the operation panel 304 when use of the panel function is disabled, and displays the screen display 350 on the operation panel 304 (step S402).

The identification information used to decide whether access control commands have been received from an authorized authentication apparatus 101 is not restricted to MAC addresses as described in the first embodiment. Other identification information such as IP addresses may be used. If, for example, IP addresses are used, in step S208 in the flowchart in FIG. 12, the authentication apparatus 101 sends the access control commands to an information processing apparatus 102 with an IP address prestored in the authentication apparatus 101, and in step S301 in the flowchart in FIG. 13, the information processing apparatus 102 decides whether the access control commands have been received from an authentication apparatus 101 with an identifying number (IP address) prestored in the information processing apparatus 102.

The command format and protocol by which the access control commands are sent is not restricted to the protocol (SNMP) used in the first embodiment.

The method of interconnecting an authentication apparatus 101 to an information processing apparatus 102 is not restricted to use of a network as described in the first embodiment. Other interconnection methods such as a universal serial bus (USB) may be used.

The user information input device is not restricted to a smart card reader as described in the first embodiment. Other devices such as a vein authentication device or a general-purpose operation panel may be used.

The user authentication information in smart card authentication is not restricted to personal information individually assigned to a smart card as described in the first embodiment. Other information such as a user name or employee number stored in a smart card may be used.

The accessible functions are not restricted to the printing, scanning, facsimile, and network access functions mentioned in the first embodiment.

As described above, according to the information processing system in the first embodiment, since the authentication apparatus 101 carries out user authentication and access control processing and decides, according to the authenticated user information, which functions should be made accessible, the information processing apparatus 102 does not have to provide the user authentication function itself. The information processing apparatus 102 can easily be interfaced with authentication devices, including both smart card and biometric authentication devices, using a variety of authentication methods and protocols, such as LDAP and Kerberos, even if these methods are protocols were not originally contemplated by the designer of the information processing apparatus 102.

Second Embodiment

Figure 17:
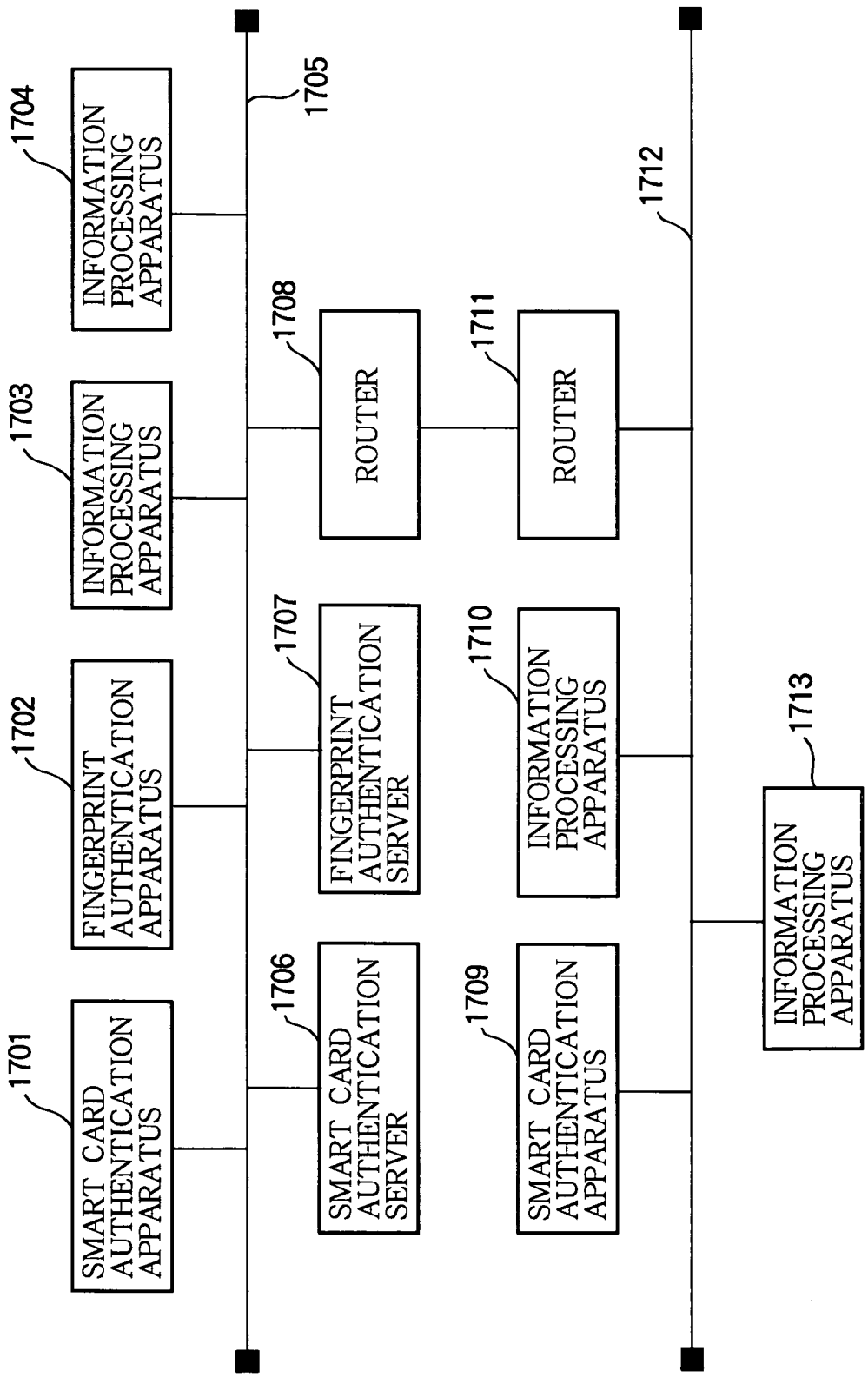
FIG. 17 is a block diagram showing the general configuration of an information processing system according to a second embodiment of the invention.

Referring to FIG. 17, the second embodiment is an information processing system comprising a pair of smart card authentication apparatuses 1701, 1709.

Each of the smart card authentication apparatuses 1701, 1709 includes a smart card reader, sends user authentication information read by the smart card reader to a smart card authentication server 1706, receives accessible function information determined by the smart card authentication server 1706 from the user authentication information, generates access control commands based on the accessible function information, and sends the access control commands to an information processing apparatus selected by the user.

The system in FIG. 17 also includes a fingerprint authentication apparatus 1702 equipped with a fingerprint reader. The fingerprint authentication apparatus 1702 sends user authentication information read by the fingerprint reader to a fingerprint authentication server 1707, receives accessible function information determined by the fingerprint authentication server 1707 from the user authentication information, generates access control commands based on the accessible function information, and sends the access control commands to an information processing apparatus chosen by the user.

The smart card authentication server 1706 and fingerprint authentication server 1707 both receive user authentication information, perform user authentication, and send accessible function information determined in the user authentication process to the device that sent the user authentication information.

Each of information processing apparatuses 1703, 1704, 1710, 1713 has the same structure and performs the same operation as the information processing apparatus 102 in the first embodiment. Network 1705 interconnects smart card authentication apparatus 1701, the fingerprint authentication apparatus 1702, information processing apparatuses 1703, 1704, the smart card authentication server 1706, and the fingerprint authentication server 1707; network 1712 interconnects smart card authentication apparatus 1709 and information processing apparatuses 1710, 1713. Networks 1705 and 1712 are different network segments, placed on different floors of a building, and are interconnected by routers 1708, 1711. Interconnection of devices through segmented networks is a known technology, a detailed description of which will be omitted.

Figure 18:
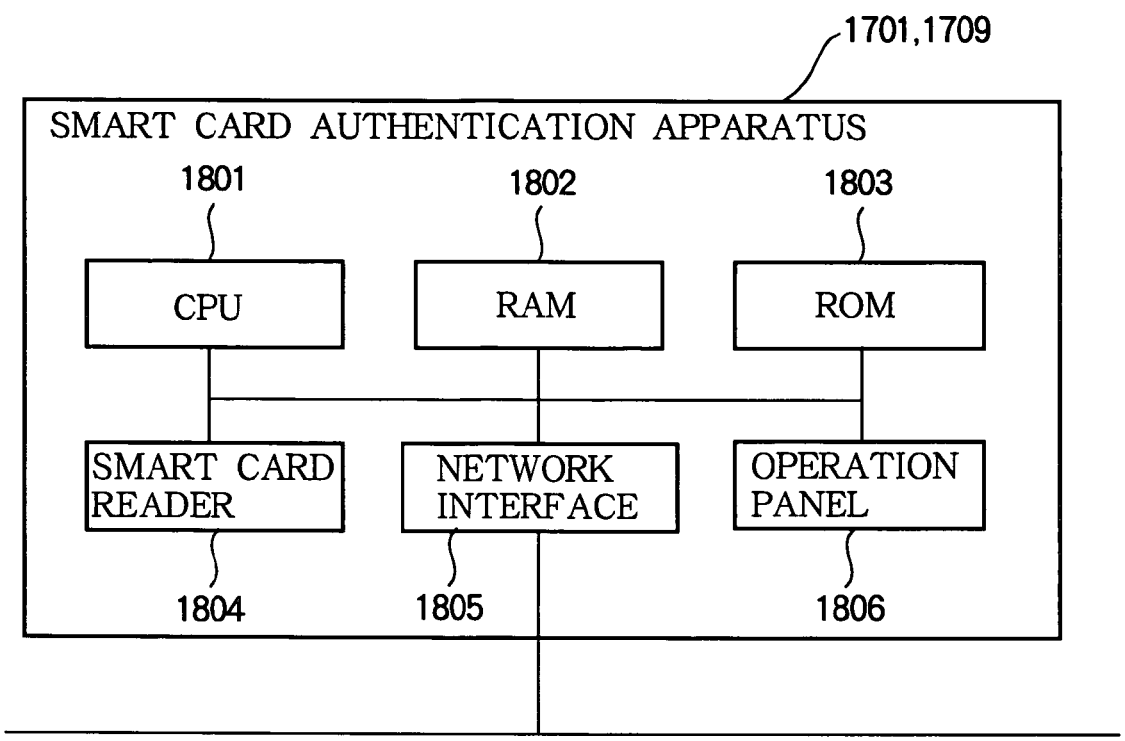
FIG. 18 is a block diagram showing the main components of the smart card authentication apparatus in the second embodiment.

Referring to FIG. 18, the main components of each of the smart card authentication apparatuses 1701, 1709 are a CPU 1801 for controlling the overall operation of the smart card authentication apparatus 1701 or 1709, RAM 1802 for volatile storage of various information, ROM 1803 for storage of programs executed by the CPU 1801, a smart card reader 1804 for reading user authentication information from smart cards, a network interface 1805 for connecting the smart card authentication apparatus 1701 to network 1705 or the smart card authentication apparatus 1709 to network 1712, and an operation panel 1806 having a touch screen.

Figure 19:
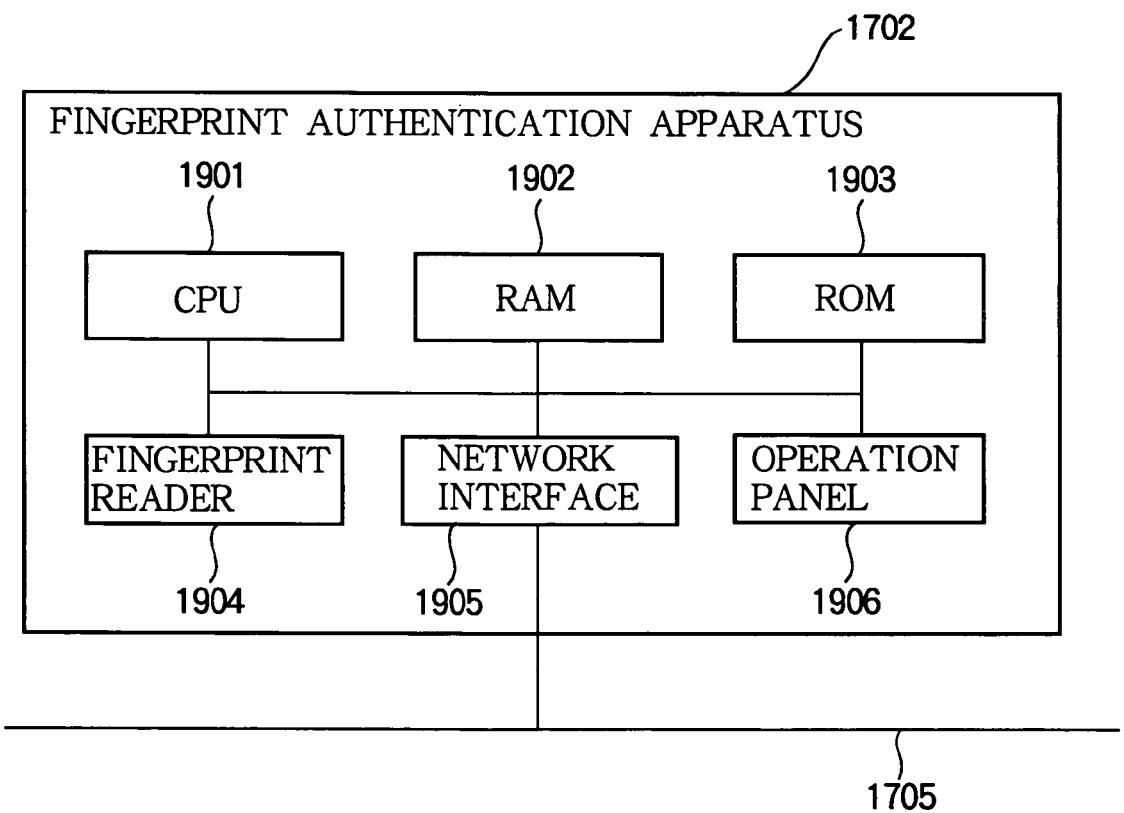
FIG. 19 is a block diagram showing the main components of the fingerprint authentication apparatus in the second embodiment.

Referring to FIG. 19, the main components of the fingerprint authentication apparatus 1702 are a CPU 1901 for controlling the overall operation of the fingerprint authentication apparatus 1702, RAM 1902 for volatile storage of various information, ROM 1903 for storing programs executed by the CPU 1901, a fingerprint reader 1904 for reading fingerprints, a network interface 1905 for connecting the fingerprint authentication apparatus 1702 to network 1705, and an operation panel 1906 having a touch screen.

Figure 20:
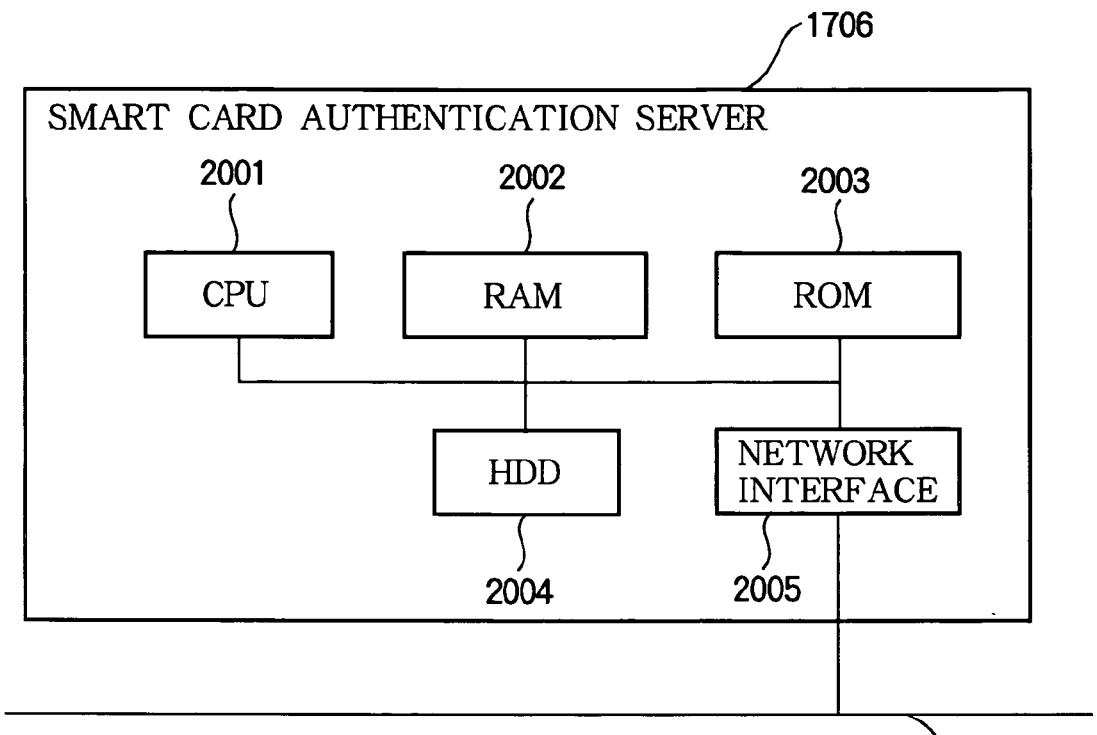
FIG. 20 is a block diagram showing the main components of the smart card authentication server in the second embodiment.

Referring to FIG. 20, the main components of the smart card authentication server 1706 are a CPU 2001 for controlling the overall operation of the smart card authentication server 1706, RAM 2002 for volatile storage of various information, ROM 2003 for storing programs executed by the CPU 2001, a hard disk drive 2004 for nonvolatile storage of various information, and a network interface 2005 for connecting the smart card authentication server 1706 to network 1705.

Figure 21:
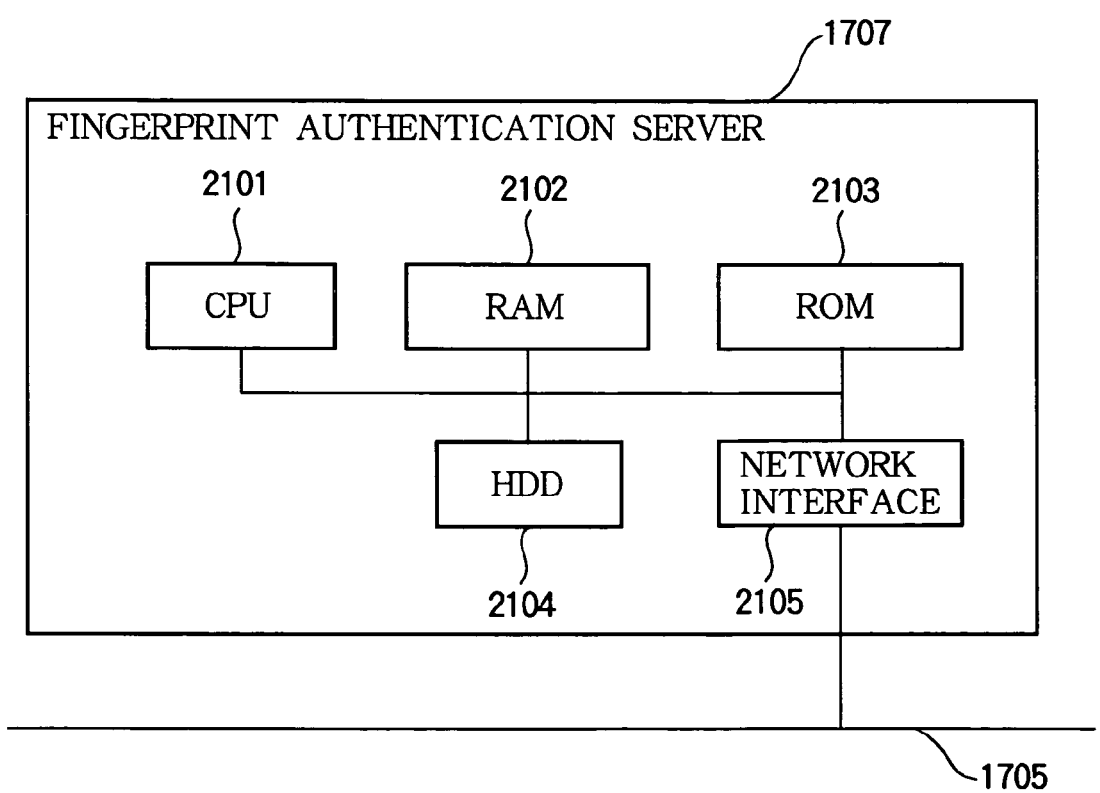
FIG. 21 is a block diagram showing the main components of the fingerprint authentication server in the second embodiment.

Referring to FIG. 21, the main components of the fingerprint authentication server 1707 are a CPU 2101 for controlling the overall operation of the fingerprint authentication server 1707, RAM 2102 for volatile storage of various information, ROM 2103 for storage of programs executed by the CPU 2101, a hard disk drive 2104 for nonvolatile storage of various information, and a network interface 2105 for connecting the fingerprint authentication server 1707 to network 1705.

Figure 22:
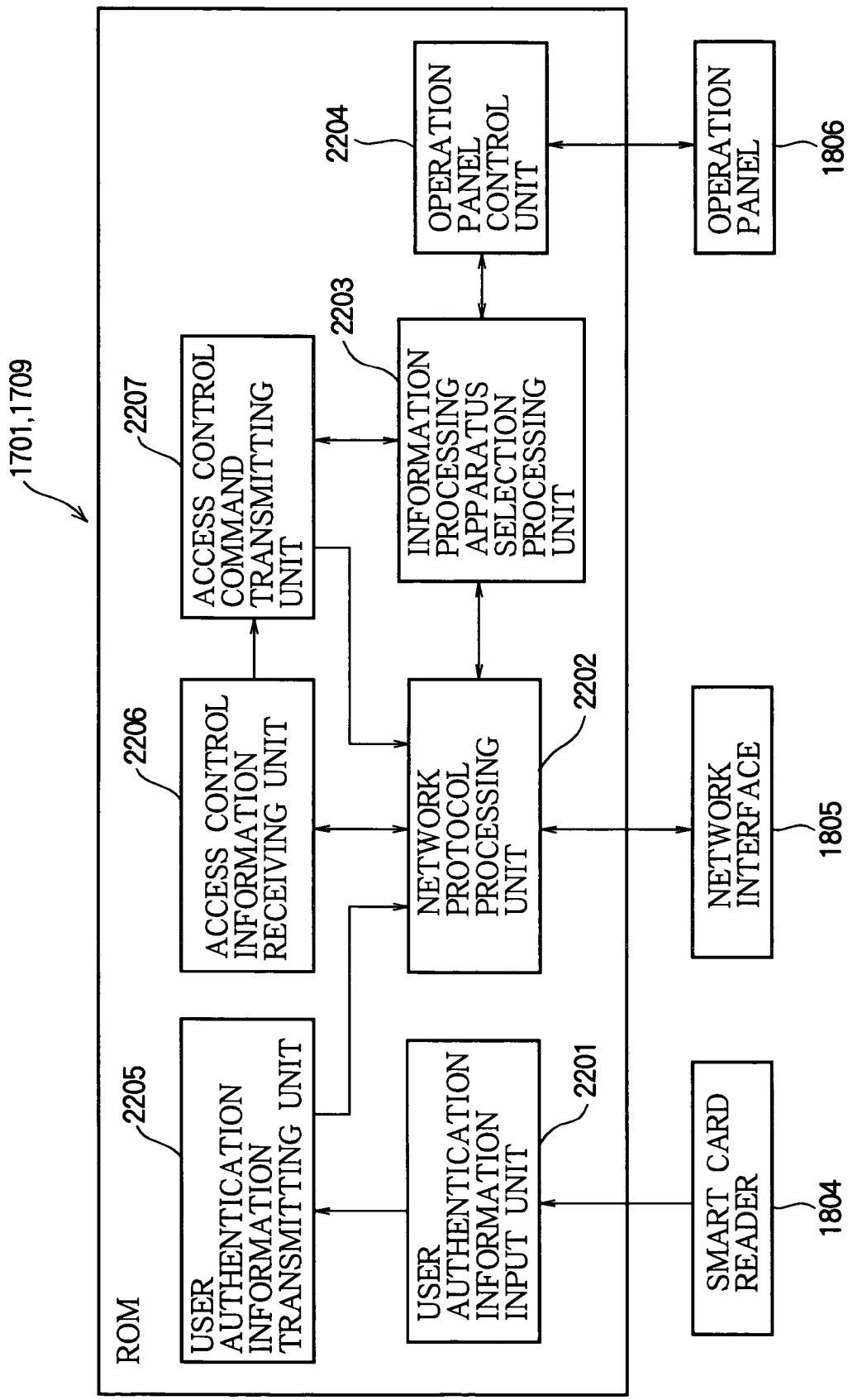
FIG. 22 is a block diagram illustrating program units and their interrelationships in the smart card authentication apparatus in the second embodiment.

Referring to FIG. 22, the programs stored in the ROM 1803 include a user authentication information input unit 2201, a network protocol processing unit 2202, an information processing apparatus selection processing unit 2203, an operation panel control unit 2204, a user authentication information transmitting unit 2205, an access control information receiving unit 2206, and an access control command transmitting unit 2207, which are related to each other and to the smart card reader 1804, network interface 1805, and operation panel 1806 as indicated by the arrows.

The user authentication information input unit 2201 in FIG. 22 reads user authentication information from the smart card reader 1804. The user authentication information is personal information individually assigned to and stored in a smart card. The user authentication information transmitting unit 2205 sends the user authentication information read by the smart card reader 1804 to the smart card authentication server 1706 (FIG. 17) via the network protocol processing unit 2202. The access control information receiving unit 2206 receives accessible function information from the smart card authentication server 1706 via the network protocol processing unit 2202, and sends the accessible function information to the access control command transmitting unit 2207. The access control command transmitting unit 2207 generates access control commands based on the specified accessible function information, and sends the access control commands via the network protocol processing unit 2202 to a chosen information processing apparatus found by the information processing apparatus selection processing unit 2203.

When activated by a query from the access control command transmitting unit 2207, the information processing apparatus selection processing unit 2203 searches for usable information processing apparatus via the network protocol processing unit 2202, displays the usable information processing apparatus on the screen on the operation panel 1806 via the operation panel control unit 2204, and sends information about the information processing apparatus chosen by the user on the operation panel 1806 back to the access control command transmitting unit 2207. The operation panel control unit 2204 displays information about the usable information processing apparatus found by the information processing apparatus selection processing unit 2203 on the operation panel 1806, and informs the information processing apparatus selection processing unit 2203 of the information processing apparatus chosen on the operation panel 1806 by the user.

Figure 23:
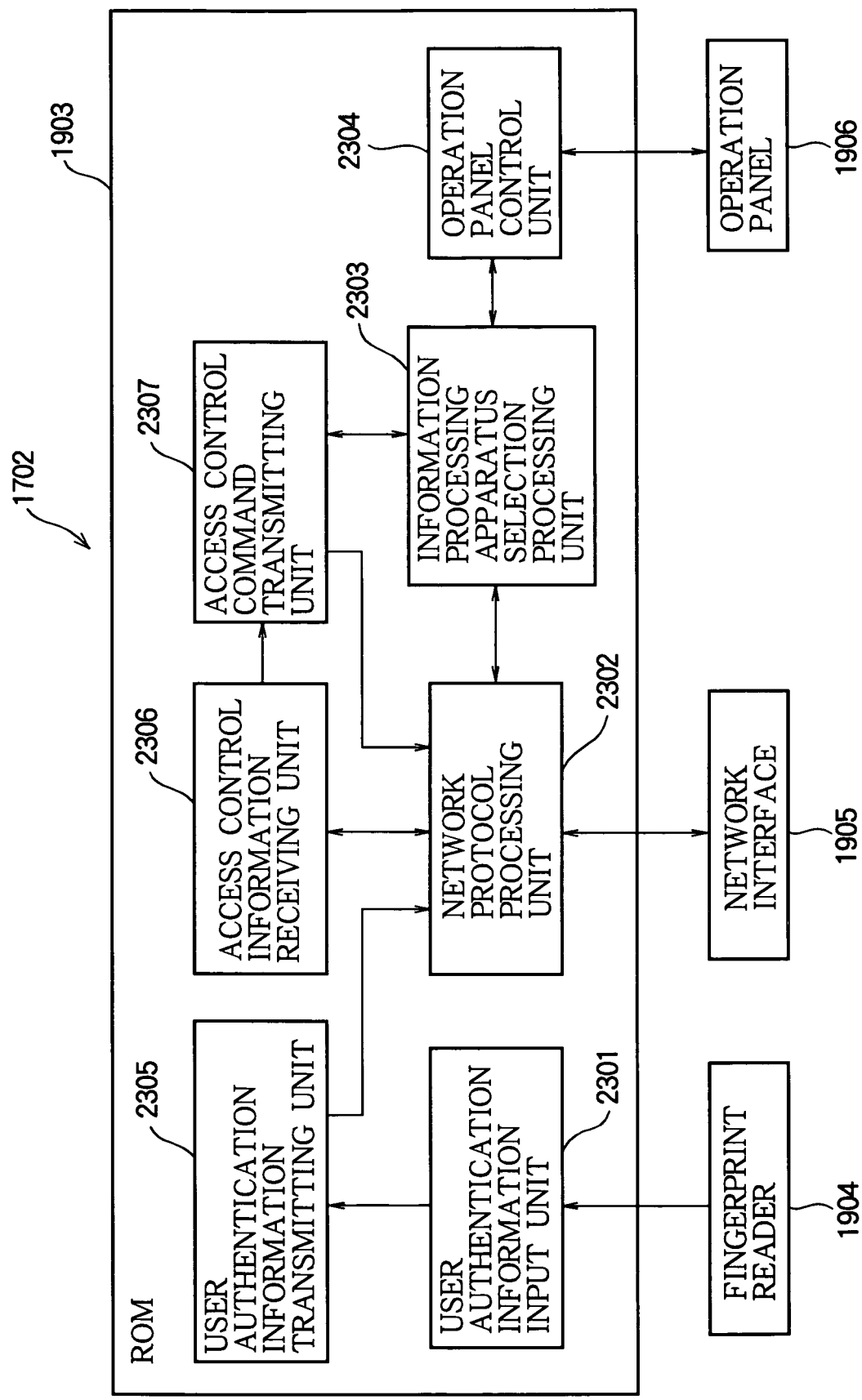
FIG. 23 is a block diagram illustrating program units and their interrelationships in the fingerprint authentication apparatus in the second embodiment.

Referring to FIG. 23, the programs stored in the ROM 1903 include a user authentication information input unit 2301, a network protocol processing unit 2302, an information processing apparatus selection processing unit 2303, an operation panel control unit 2304, a user authentication information transmitting unit 2305, an access control information receiving unit 2306, and an access control command transmitting unit 2307, which are related to each other and to the fingerprint reader 1904, network interface 1905, and operation panel 1906 as indicated by the arrows.

The user authentication information input unit 2301 in FIG. 23 reads user authentication information from the fingerprint reader 1904. The user authentication information is fingerprint feature information. The user authentication information transmitting unit 2305 sends the user authentication information read by the fingerprint reader 1904 to the fingerprint authentication server 1707 (FIG. 17) via the network protocol processing unit 2302. The access control information receiving unit 2306 receives accessible function information from the fingerprint authentication server 1707 via the network protocol processing unit 2302, and sends the accessible function information to the access control command transmitting unit 2307. The access control command transmitting unit 2307 generates access control commands based on the specified accessible function information, and sends the access control commands via the network protocol processing unit 2302 to chosen information processing apparatus found by the information processing apparatus selection processing unit 2303.

When activated by a query from the access control command transmitting unit 2307, the information processing apparatus selection processing unit 2303 searches for usable information processing apparatus via the network protocol processing unit 2302, displays the usable information processing apparatus on the screen on the operation panel 1906 via the operation panel control unit 2304, and sends information about the information processing apparatus chosen by the user on the operation panel 1906 back to the access control command transmitting unit 2307. The operation panel control unit 2304 displays information about the usable information processing apparatus found by the information processing apparatus selection processing unit 2303 on the operation panel 1906, and informs the information processing apparatus selection processing unit 2303 of the information processing apparatus chosen on the operation panel 1906 by the user.

Figure 24:
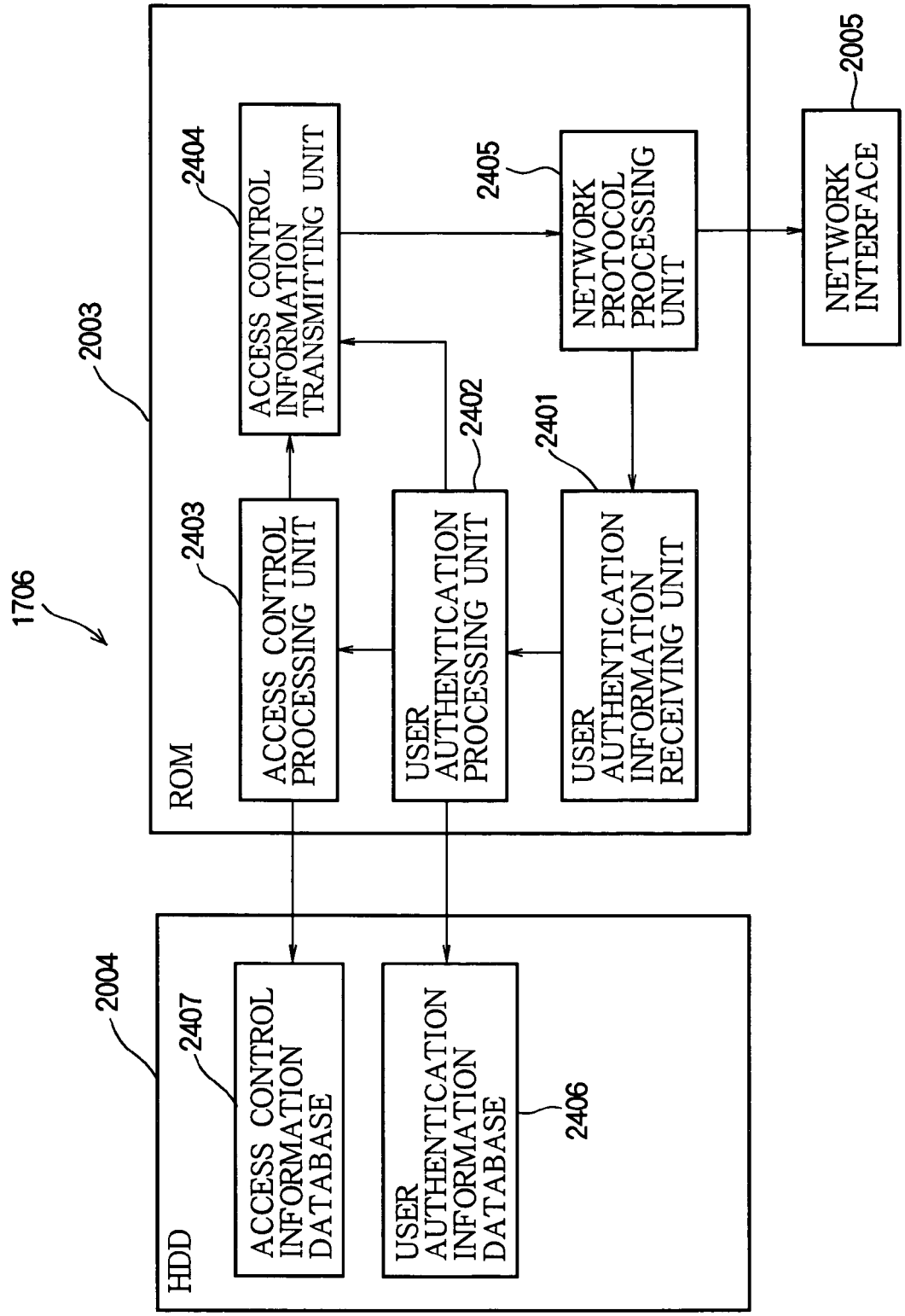
FIG. 24 is a block diagram illustrating program units and databases and their interrelationships in the smart card authentication server in the second embodiment.

Referring to FIG. 24, the programs stored in the ROM 2003 include a user authentication information receiving unit 2407, a user authentication processing unit 2402, an access control processing unit 2403, an access control information transmitting unit 2404, and a network protocol processing unit 2405, and the information stored in the HDD 2004 includes a user authentication information database 2406 and an access control information database 2407. In the authentication processing performed in the smart card authentication server 1706, these program units and databases are related to each other and to the network interface 2005 as indicated by the arrows.

The user authentication information receiving unit 2407 in FIG. 24 receives user authentication information from the smart card authentication apparatus 1701 or the smart card authentication apparatus 1709. The user authentication processing unit 2402 searches the user authentication information database 2406 according to the user authentication information received from the smart card authentication apparatus 1701 or the smart card authentication apparatus 1709 to decide whether the user is registered as an authorized user. The access control processing unit 2403 searches the access control information database 2407 according to authenticated user information to obtain accessible function information. The access control information transmitting unit 2404 sends the obtained accessible function information via the network protocol processing unit 2405 to the device that sent the user authentication information.

As an example, it will be assumed that the user authentication information shown in FIG. 6 which was stored in the user authentication information database 406 in the first embodiment, is also stored in user authentication information database 2406, and that the accessible function information shown in FIG. 7, which was stored in the access control information database 407 in the first embodiment is also stored in access control information database 2407.

Figure 25:
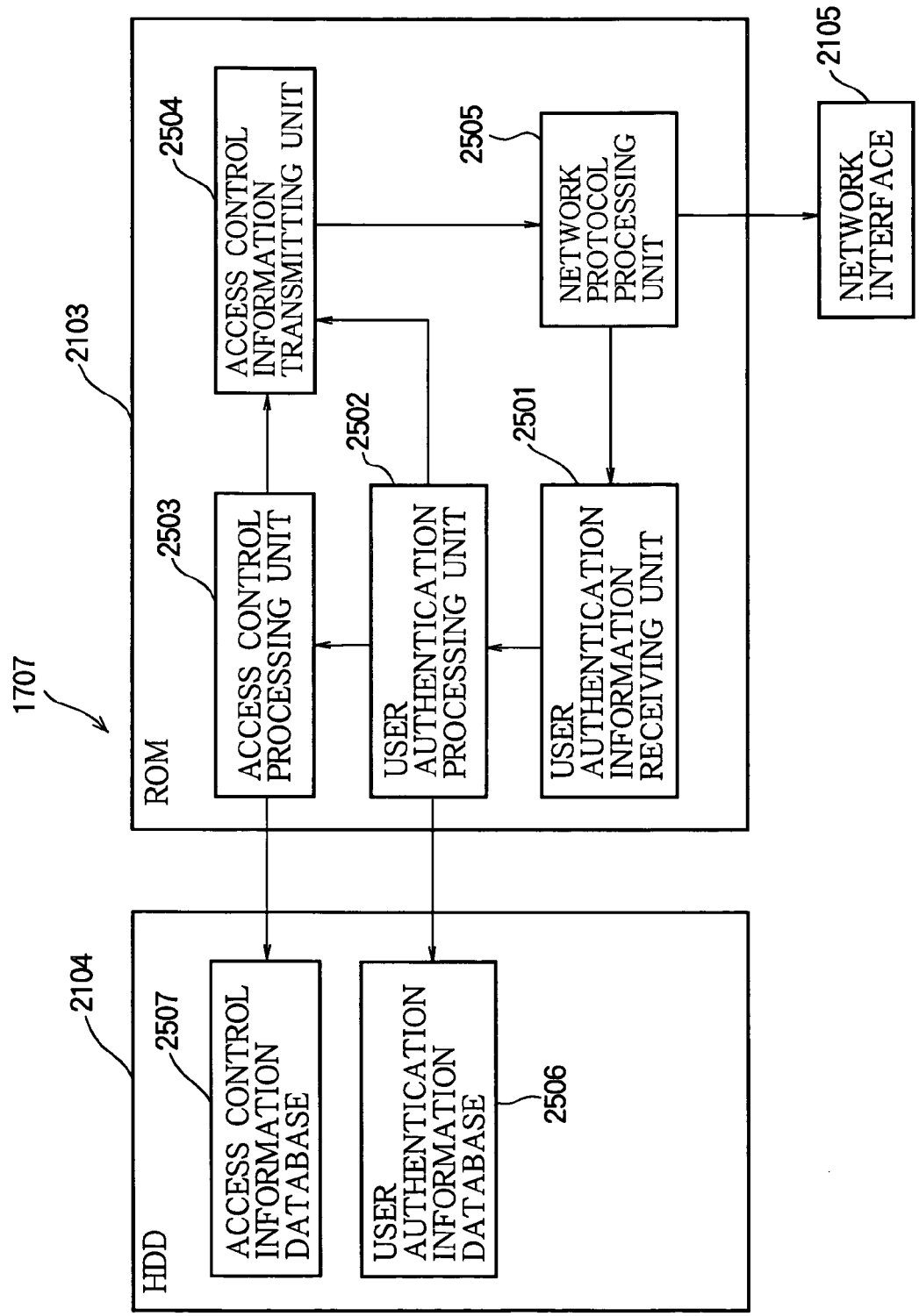
FIG. 25 is a block diagram illustrating program units and databases and their interrelationships in the fingerprint authentication server in the second embodiment.

Referring to FIG. 25, the programs stored in the ROM 2103 include a user authentication information receiving unit 2501, a user authentication processing unit 2502, an access control processing unit 2503, an access control information transmitting unit 2504, and a network protocol processing unit 2505, and the information stored in the HDD 2104 includes a user authentication information database 2506 and an access control information database 2507. In the authentication processing performed in the fingerprint authentication server 1707, these program units and databases are related to each other and to the network interface 2105 as indicated by the arrows.

The user authentication information receiving unit 2501 in FIG. 25 receives user authentication information from the fingerprint authentication apparatus 1702. The user authentication processing unit 2502 searches the user authentication information database 2506 according to the user authentication information received from the fingerprint authentication apparatus 1702 to decide whether the user is registered as an authorized user. The access control processing unit 2503 searches the access control information database 2507 according to authenticated user information to obtain accessible function information. The access control information transmitting unit 2504 sends the obtained accessible function information via the network protocol processing unit 2505 to the device that sent the user authentication information.

In the present example, it will be assumed that the user authentication information database 2506 and access control information database 2507 store the information shown in FIGS. 30 and 31, respectively.

The flow of the operations performed by the information processing system in the second embodiment is illustrated in the flowcharts in FIGS. 26 to 29. These operations will now be explained with reference to these flowcharts.

Figure 26:
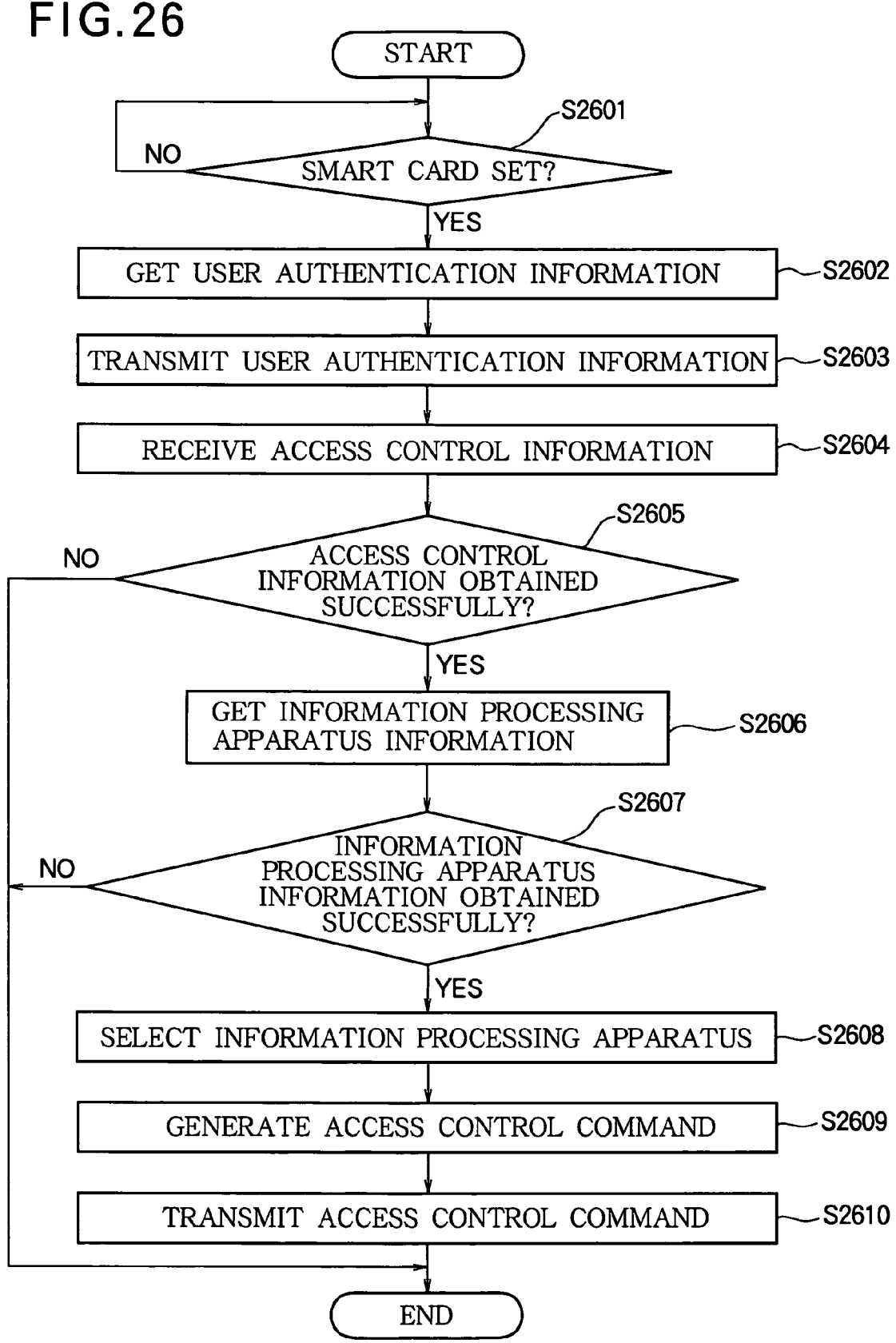
FIG. 26 is a flowchart illustrating the flow of authentication processing by the smart card authentication apparatus in the second embodiment.

The flow of authentication processing by the smart card authentication apparatus 1709 is illustrated in FIG. 26. First, the operation of the smart card authentication apparatus 1709 will be explained with reference to FIGS. 18, 22, and 26.

The user authentication information input unit 2201 regularly queries the smart card reader 1804 to decide whether a smart card is set in the smart card reader 1804 (step S2601), and reads user authentication information if the user authentication information input unit 2201 detects the setting of a smart card (step S2602). The user authentication information is personal information individually assigned to and stored in the smart card. As an example, it will be assumed that the hexadecimal value 0x01010204050A00A8 is read as user authentication information. The user authentication information transmitting unit 2205 sends the user authentication information read by the user authentication information input unit 2201 via the network protocol processing unit 2202 to the smart card authentication server 1706 with the prestored server addresses (step S2603).

When the user authentication information is received, the smart card authentication server 1706 searches the access control information database 2407 and obtains the accessible function information shown in FIG. 32, and the access control information receiving unit 2206 receives the obtained accessible function information from the smart card authentication server 1706 (step S2604). If the smart card authentication apparatus 1709 succeeds in obtaining accessible function information, the authentication processing proceeds to the next step (step S2605, 'Yes'). If the smart card authentication apparatus 1709 fails to obtain accessible function information, the authentication processing ends (step S2605, 'No'). When the accessible function information is received via the access control information receiving unit 2206 from the smart card authentication server 1706, the access control command transmitting unit 2207 queries the information processing apparatus selection processing unit 2203 about the information processing apparatus to which the accessible function information should be sent. The information processing apparatus selection processing unit 2203 finds information processing apparatus connected to the same network segment as smart card authentication apparatus 1709 by using a known network discovery method via the network protocol processing unit 2202, and learns whether the panel functions of the information processing apparatus it finds are enabled or disabled by receiving access control commands sent by a protocol (SNMP) as described in relation to FIG. 8 in the first embodiment (step S2606).

If use of the panel function is disabled, the information processing apparatus selection processing unit 2203 assumes that the information processing apparatus is not currently being used and is thus available for use. In the present example, the information processing apparatus selection processing unit 2203 finds that information processing apparatuses 1710, 1713 are connected to the same network segment 1712 as the smart card authentication apparatus 1709, as shown in FIG. 17. If, for example, the information processing apparatus selection processing unit 2203 determines from the access control commands sent by the protocol (SNMP) mentioned in the first embodiment that use of the panel functions of both information processing apparatuses 1710, 1713 is disabled, indicating that the information processing apparatuses 1710, 1713 are not currently being used, the information processing apparatus selection processing unit 2203 decides that both apparatuses are available for use. If the information processing apparatus selection processing unit 2203 succeeds in finding a usable information processing apparatus, the authentication processing proceeds to the next step (step S2607, 'Yes'). If the information processing apparatus selection processing unit 2203 fails to find any usable information processing apparatus, the authentication processing ends (step S2607, 'No').

When a usable information processing apparatus is found, the information processing apparatus selection processing unit 2203 informs the operation panel control unit 2204. The operation panel control unit 2204 displays an information processing apparatus selection menu as shown in FIG. 34 on the screen on the operation panel 1806 according to the information specified by the information processing apparatus selection processing unit 2203 about the usable information processing apparatus. The information processing apparatus selection menu includes a 'select device to use' title 3401, a selection button 3402 for choosing information processing apparatus 1710, and a selection button 3403 for choosing information processing apparatus 1713. If, for example, the user presses selection button 3402, the operation panel control unit 2204 informs the access control command transmitting unit 2207 via the information processing apparatus selection processing unit 2203 that the user has chosen information processing apparatus 1710 (step S2608).

The access control command transmitting unit 2207 generates access control commands based on the accessible function information (step S2609), and sends the access control commands via the network protocol processing unit 2202 to the chosen information processing apparatus 1710 (step S2610). In this example, the access control commands give the MIB names and enable/disable settings indicated in FIG. 33. An additional panel access control command enabling use of the panel function is generated when the information processing apparatus selection processing unit 2203 succeeds in finding a usable information processing apparatus, and this access control command is sent in addition to the access control commands generated from the access control information.

Figure 28:
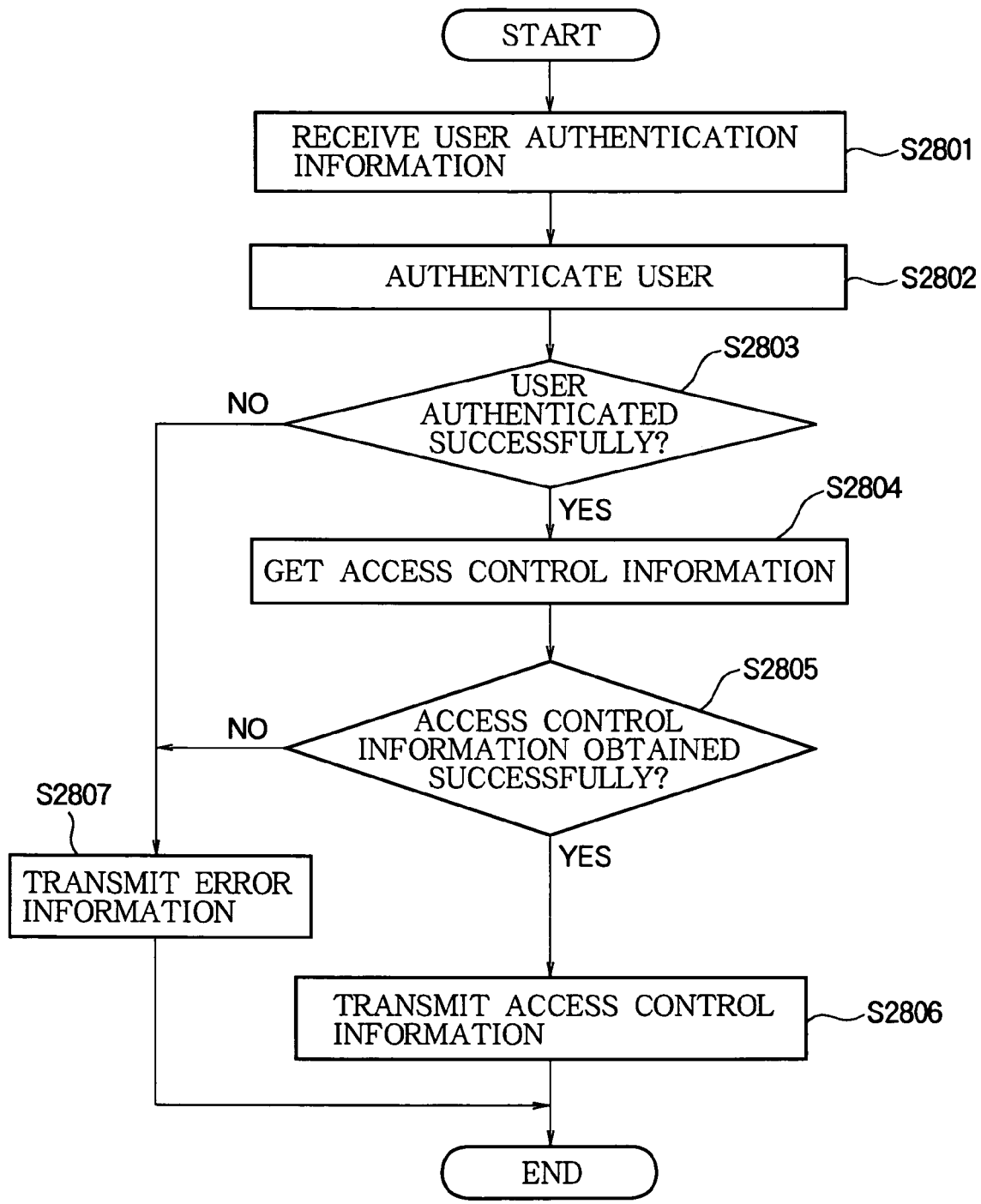
FIG. 28 is a flowchart illustrating the flow of information processing by the smart card authentication server in the second embodiment.

The flow of information processing by the smart card authentication server 1706 is illustrated in FIG. 28. Next, the operation of the smart card authentication server 1706 will be explained with reference to FIG. 20, FIG. 24, and FIG. 28.

The user authentication information receiving unit 2407 receives user authentication information via the network protocol processing unit 2405 (step S2801). As an example, it will be assumed that the user authentication information receiving unit 2407 receives the hexadecimal value 0x01010204050A00A8 sent as user authentication information by smart card authentication apparatus 1709. The user authentication processing unit 2402 searches the user authentication information database 2406 according to the received user authentication information and performs user authentication (step S2802). As noted above, the user authentication information shown in FIG. 6 is stored in the user authentication information database 2406. The user authentication information 0x01010204050A00A8 is found in the bottom line in FIG. 6. Accordingly, user authentication succeeds and the user authentication processing unit 2402 identifies the user as the user with the user ID '5' as user information (step S2803, 'Yes'). If user authentication fails (step S2803, 'No'), the user authentication processing unit 2402 sends error information to the device that sent the user authentication information (step S2807), and the processing ends.

When the user is authenticated, the access control processing unit 2403 searches the access control information database 2407 according to user information to obtain accessible function information (step S2804). As noted above, the accessible function information stored shown in FIG. 7 is stored in the access control information database 2407. The accessible function information for the user with user ID '5' is found in the bottom line in FIG. 7, indicating 'ON' for the printing function, and 'OFF' for the scanning, network, and facsimile functions. When accessible function information is obtained as above (step S2805, 'Yes'), the access control information transmitting unit 2404 sends the obtained accessible function information, shown in FIG. 32, to the device that sent the user authentication information (step S2806). If accessible function information cannot be obtained (step S2805, 'No'), the access control information transmitting unit 2404 sends error information to the device that sent the user authentication information (step S2807), and the processing ends.

The operation of information processing apparatus 1710 is the same as the operation of the information processing apparatus 102 in the first embodiment. After the access control commands are received, if use of the panel function is enabled, the screen shown in FIG. 35, for example, is displayed on the operation panel 1720. When use of the scanning, facsimile, and network functions is disabled as indicated in FIG. 32, the 3501 in FIG. 35 includes a print menu button 3502 and logout button 3506, the use of which is enabled, and a scan menu button 3503, facsimile menu button 3504, and network menu button 3505, the use of which is disabled as indicated by icons.

Figure 27:
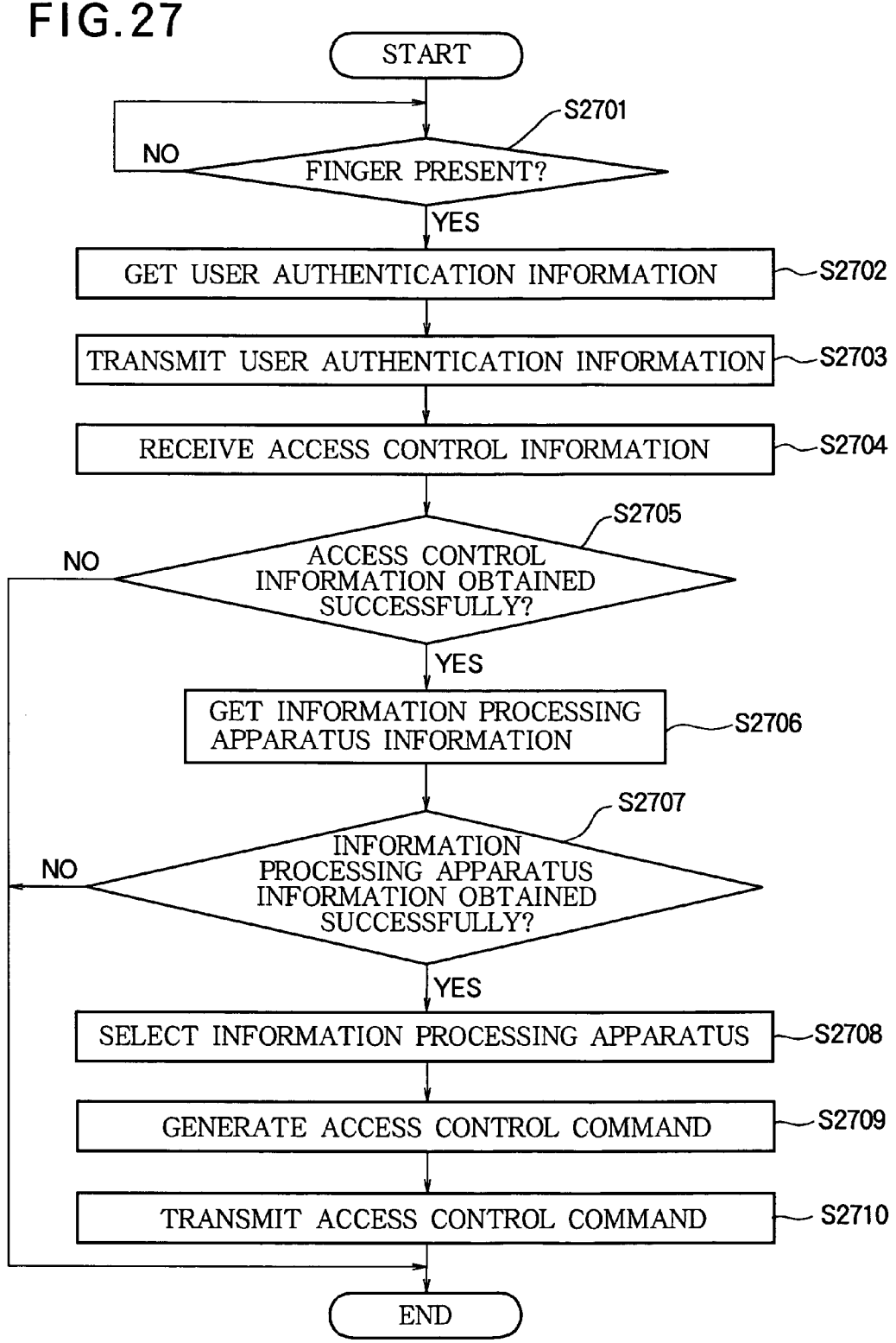
FIG. 27 is a flowchart illustrating the flow of authentication processing by the fingerprint authentication apparatus in the second embodiment.

The flow of authentication processing by the fingerprint authentication apparatus 1702 is illustrated in FIG. 27. Next, the operation of the fingerprint authentication apparatus 1702 will be explained with reference to FIGS. 19, 23, and 27.

The user authentication information input unit 2301 regularly queries the fingerprint reader 1904 as to the presence of a finger (step S2701), and reads user authentication information from the fingerprint reader 1904 if a finger is present (step S2702). The user authentication information is fingerprint feature information. The user authentication information transmitting unit 2305 sends the user authentication information read by the user authentication information input unit 2301 via the network protocol processing unit 2302 to the fingerprint authentication server 1707, the address of which is prestored (step S2703).

The fingerprint authentication server 1707 uses the fingerprint feature information received as user authentication information to obtain the accessible function information shown in FIG. 36, which is returned to the fingerprint authentication apparatus 1702 and received by the access control information receiving unit 2306 (step S2704). When accessible function information is obtained (step S2705, 'Yes'), the authentication processing proceeds to the next step; if accessible function information is not obtained (step S2705, 'No'), the authentication processing ends. When the accessible function information is obtained, it is received via the access control information receiving unit 2306 by the access control command transmitting unit 2307, which queries the information processing apparatus selection processing unit 2303 about the information processing apparatus to which the accessible function information should be sent. The information processing apparatus selection processing unit 2303 finds information processing apparatus connected to the same network segment as the fingerprint authentication apparatus 1702 by using a known network discovery method via the network protocol processing unit 2302, and learns whether the panel function of the information processing apparatus it finds is enabled or disabled by receiving SNMP commands as described in relation to FIG. 8 in the first embodiment (step S2706).

If use of the panel function is disabled, the information processing apparatus selection processing unit 2303 assumes that the information processing apparatus is not currently being used and is thus available for use. In the present example, the information processing apparatus selection processing unit 2303 finds that information processing apparatuses 1703 and 1704 are connected to the same network segment 1705 as the fingerprint authentication apparatus 1702, as shown in FIG. 17, and determines from the SNMP commands described in FIG. 8 in the first embodiment that use of the panel function of both information processing apparatuses 1703, 1704 is disabled, indicating that the information processing apparatuses 1703, 1704 are not currently being used. The information processing apparatus selection processing unit 2303 decides that both apparatuses are available for use (step S2707, 'Yes') and, since it has succeeded in finding a usable information processing apparatus, proceeds to the next step. If the information processing apparatus selection processing unit 2303 fails to find any usable information processing apparatus (step S2707, 'No'), the authentication processing ends.

Figure 38:
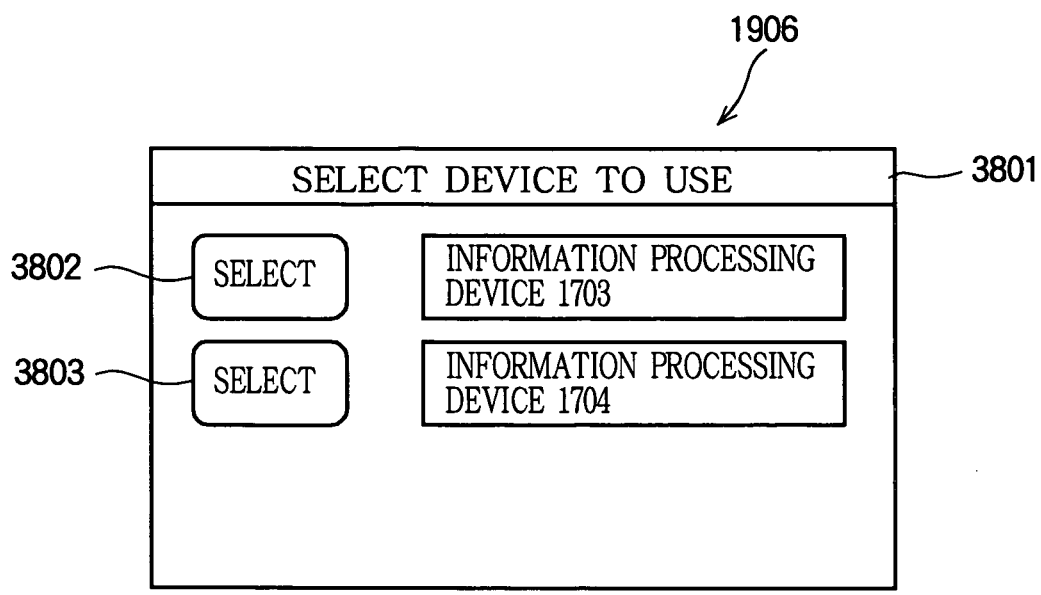
FIG. 38 shows an exemplary screen displayed on the operation panel for selecting a usable information processing apparatus when fingerprint authentication is performed in the second embodiment.

When usable information processing apparatus is found, the information processing apparatus selection processing unit 2303 informs the operation panel control unit 2304. The operation panel control unit 2304 displays an information processing apparatus selection menu as shown in FIG. 38 on the screen on the operation panel 1906 according to the information specified by the information processing apparatus selection processing unit 2303 about the usable information processing apparatus. In this example, the information processing apparatus selection menu includes a 'select device to use' title 3801, a selection button 3802 for choosing information processing apparatus 1703, and a selection button 3803 for choosing information processing apparatus 1704. If, for example, the user presses selection button 3803, the operation panel control unit 2304 informs the access control command transmitting unit 2307 via the information processing apparatus selection processing unit 2303 that the user has chosen information processing apparatus 1704 (step S2708).

The access control command transmitting unit 2307 generates access control commands based on the accessible function information (step S2709), and sends the access control commands via the network protocol processing unit 2302 to the chosen information processing apparatus 1704 (step S2710). In this example, the access control commands give the MIB names and enable/disable settings indicated in FIG. 37, including the additional panel access control command enabling use of the panel function that is generated when the information processing apparatus selection processing unit 2303 succeeds in finding usable information processing apparatus.

Figure 29:
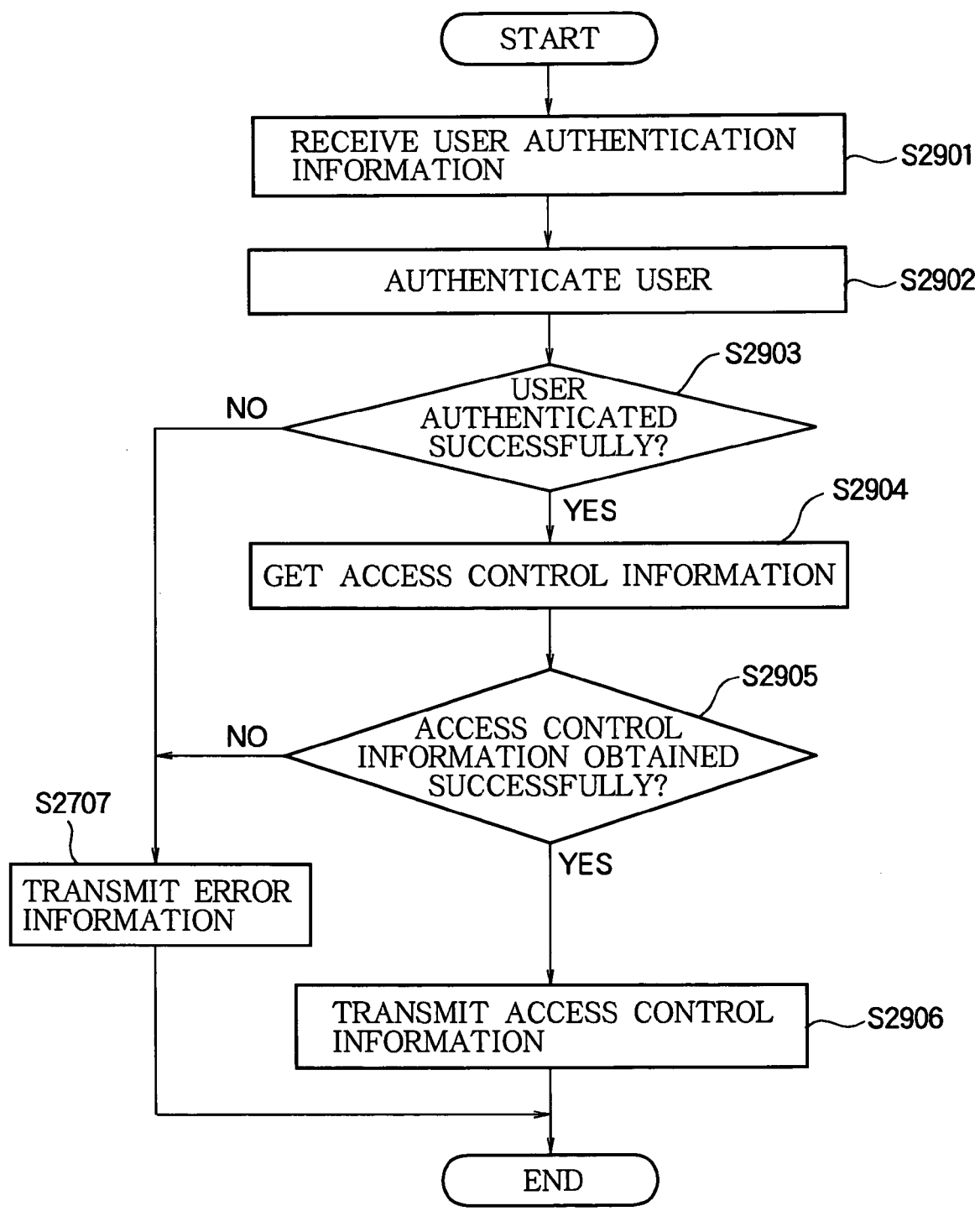
FIG. 29 is a flowchart illustrating the flow of information processing by the fingerprint authentication server in the second embodiment.

The flow of information processing by the fingerprint authentication server 1707 is illustrated in FIG. 29. Next, the operation of the fingerprint authentication server 1707 will be explained with reference to FIGS. 21, 25, and 29.

The user authentication information receiving unit 2501 receives user authentication information via the network protocol processing unit 2505 (step S2901). It will be assumed that the user authentication information receiving unit 2501 receives the fingerprint feature information sent as user authentication information by the fingerprint reader 1904. The user authentication processing unit 2502 searches the user authentication information database 2506 according to the user authentication information received from the fingerprint authentication apparatus 1702 to perform user authentication (step S2902). The user authentication information shown in FIG. 30 is stored in the user authentication information database 2506. It will be assumed that the fingerprint feature information received as user authentication information matches feature information '3' in FIG. 30. Accordingly, user authentication succeeds and the user is identified as the user with the user ID '103' as user information (step S2903, 'Yes'). If user authentication fails (step S2903, 'No'), the user authentication processing unit 2502 sends error information to the device that sent the user authentication information (step S2907), and the processing ends.

When the user has been authenticated, the access control processing unit 2503 searches the access control information database 2507 according to the user information to obtain accessible function information (step S2904). The accessible function information shown in FIG. 31 is stored in the access control information database 2507. The accessible function information for the user with user ID '103' is found in the third row in FIG. 31, indicating 'ON' for the scanning and facsimile functions, and 'OFF' for the printing and network functions. Since accessible function information has been successfully obtained (step S2905, 'Yes'), the access control information transmitting unit 2504 sends the obtained accessible function information, shown in FIG. 36, to the device that sent the user authentication information (step S2906). If accessible function information cannot be obtained (step S2905, 'No'), the access control information transmitting unit 2504 sends error information to the device that sent the user authentication information (step S2907) and the processing ends.

Accordingly, in this example, in step S2704 in the flowchart shown in FIG. 27, the fingerprint authentication apparatus 1702 receives the accessible function information shown in FIG. 36.

Figure 39:
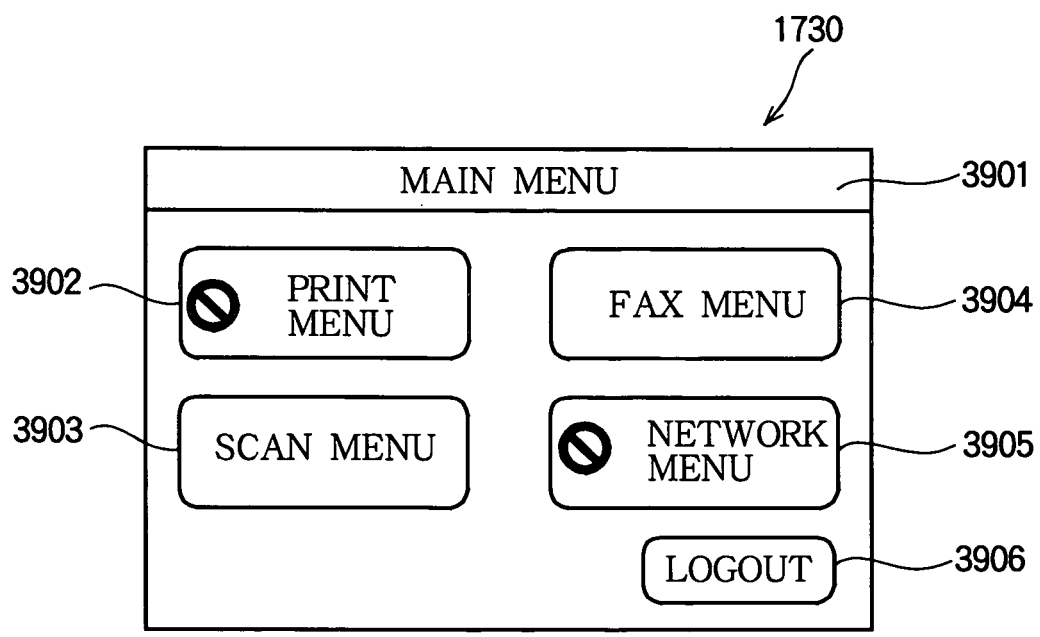
FIG. 39 shows an exemplary screen displayed on the operation panel when fingerprint authentication is performed and use of the panel function is enabled, after the access control commands are received in the second embodiment.

The operation of the information processing apparatus 1704 is the same as the operation of the information processing apparatus in the first embodiment. After the access control commands are received, if use of the panel function is enabled, the main menu 3901 shown in FIG. 39, for example, is displayed on the operation panel 1730. In the present example, the main menu 3901 includes a scan menu button 3903, facsimile menu button 3904, and logout button 3906, the use of which is enabled, and a print menu button 3902 and network menu button 3905, the use of which is disabled as indicated by icons.

Providing an authentication apparatus with a function for selecting an available information processing apparatus enables a single authentication apparatus to perform authentication for a plurality of information processing apparatuses. One anticipated effect is a reduction in the space used for installing authentication apparatus. It is also anticipated that selective use of a plurality of information processing apparatus will be more convenient for the user.

The accessible function information database in the second embodiment is not limited to prescribing the accessibility per user ID of printing, scanning, facsimile, and network functions as shown in FIG. 7. If, for example, there is a color printing capability, information indicating whether the color printing function may be accessed can be added to the database, and when the screen shown in FIG. 35 is displayed on the operation panel 1720, the single print menu button 3502 may be replaced by a color printing menu button and a black-and-white printing menu button. If use of the color printing function is disabled but use of the black-and-white printing function is allowed, this can then be indicated by an icon.

The scheme for selecting an information processing apparatus is not restricted to the scheme illustrated in FIG. 26, in which the user chooses a single information processing apparatus from a menu as shown in FIG. 34 and access control commands are sent only to the chosen information processing apparatus. In another exemplary scheme, access control commands are sent to all information processing apparatuses found to be available for use, and when the user uses one of the available information processing apparatuses, use of the other available information processing apparatuses is disabled by a control command, e.g., a command disabling use of the panel function, sent from the information processing apparatus used by the user to the other information processing apparatuses, either directly or via the smart card authentication apparatus 1709. Accordingly, the user can use whichever of the available information processing apparatuses he or she prefers, while misuse of the unused information processing apparatuses by a third party is prevented.

The command format and protocol by which the access control commands are sent is not restricted to the protocol (SNMP) used in the second embodiment.

The user information input devices are not restricted to the smart card reader and fingerprint reader shown in the second embodiment. Other devices such as a vein authentication device or a general-purpose operation panel may be used.

The user authentication information in smart card authentication is not restricted to personal information individually assigned to a smart card as described in the second embodiment. Other information such as a user name or employee number stored in a smart card may be used.

The user authentication information in fingerprint authentication is not restricted to fingerprint feature information. Other information such as a fingerprint image may be used.

The method for finding an available information processing apparatus is not restricted to the method of automatically finding information processing apparatuses connected to the same network segment as described in the second embodiment. Other methods, such as prestoring information about the information processing apparatuses in the authentication apparatus, may be used.

The accessible functions are not restricted to the printing, scanning, facsimile, and network functions mentioned in the second embodiment.

As described above, according to the information processing system in the second embodiment, since the authentication server carries out user authentication and access control processing and decides, according to the authenticated user information, which functions should be made accessible, and the authentication apparatus generates access control commands based on the accessible function information, the information processing apparatus does not have to provide a user authentication function itself. The information processing apparatus can easily be interfaced with authentication devices, including both smart card and biometric authentication devices, using a variety of authentication methods and protocols, such as LDAP and Kerberos, even if these methods and protocols were not originally contemplated by the designer of the information processing apparatus. The authentication server collectively controls the user authentication information and the accessible function information, reducing the work done by the system administrator in entering and updating the user authentication information and accessible function information.

Third Embodiment

Figure 40:
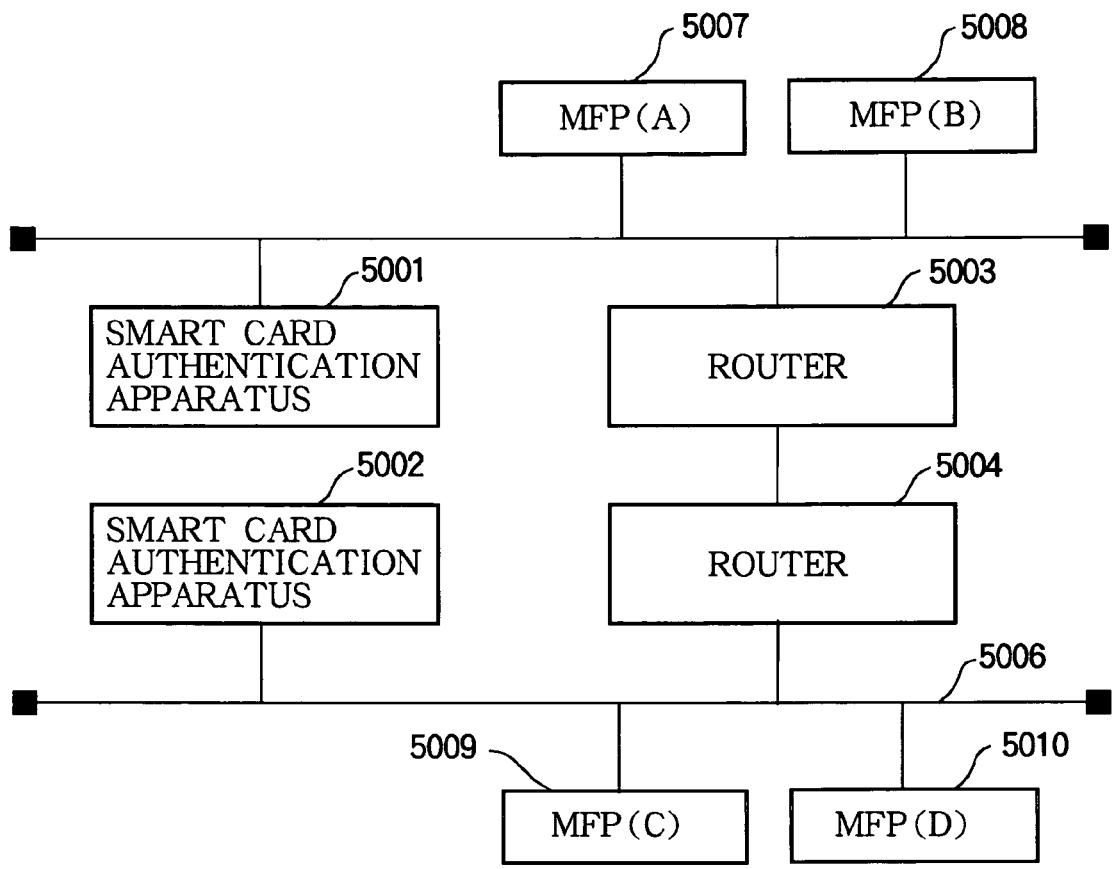
FIG. 40 is a block diagram showing the general configuration of an information processing system according to a third embodiment of the invention.

Referring to FIG. 40, the third embodiment is an information processing system comprising a pair of smart card authentication apparatuses 5501, 5002.

Smart card authentication apparatus 5001 and a pair of multifunction printers 5007, 5008 are interconnected by a network 5005; smart card authentication apparatus 5002 and another pair of multifunction printers 5009, 5010 are interconnected by another network 5006. Networks 5005 and 5006 are different network segments, placed on different floors of a building, and are interconnected by routers 5003, 5004 by known methods as in the second embodiment. The multifunction printers 5007 to 5010 are named MFP (A) to MFP (D), respectively.

Each of the smart card authentication apparatuses 5501 and 5002 in the third embodiment has (1) a function for obtaining user authentication information, similar to the function of the smart card authentication apparatus 1709 in the second embodiment, (2) a user authentication function similar to the function of the smart card authentication server 1706 in the second embodiment, (3) a function for transmitting the user ID obtained in performing user authentication, (4) a function for exchanging information with the multifunction printers 5007 to 5010, and (5) a function for information display and input on a panel.

Each of the multifunction printers 5007 to 5010 has (1) functions for storing a plurality of printing data and printing the stored printing data, (2) a function for searching an internal directory listing the stored printing data, and (3) a function for exchanging information with the smart card authentication apparatuses 5501, 5002.

The operation of the information processing system having the basic functions described above will now be explained.

If, for example, the smart card authentication apparatus 5001 performs user authentication with a smart card, the smart card authentication apparatus 5001 sends the user ID (see FIG. 6) obtained in performing the user authentication, e.g., user ID '3', to each of the multifunction printers 5007 to 5010.

A plurality of printing data have been stored in each of the multifunction printers 5007 to 5010. When the printing data were stored, for example, user authentication was performed by the smart card authentication apparatuses 5501 and 5002, and the user ID number of the user who entered the printing data is stored in association with the printing data in the internal directory of each multifunction printer.

When the user ID '3' is received from smart card authentication apparatus 5001, each of the multifunction printers 5007 to 5010 searches its directory of stored printing data to find printing data associated with the user ID '3', and sends corresponding printing data information to smart card authentication apparatus 5001.

Figure 41:
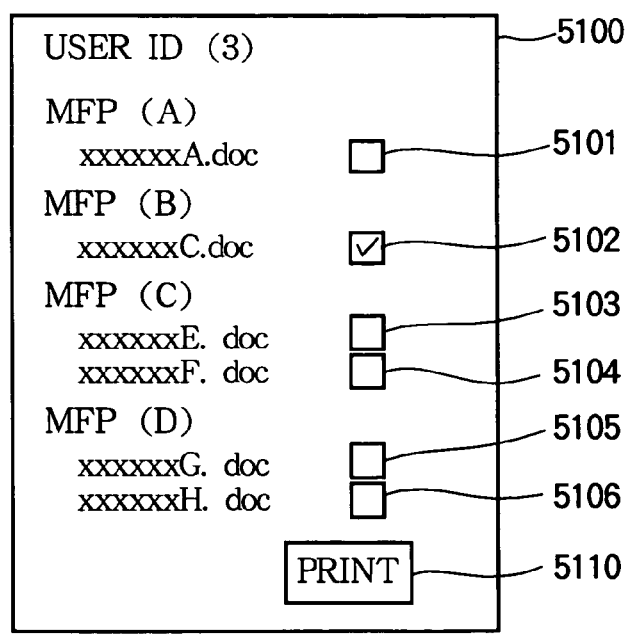
FIG. 41 shows an exemplary screen displayed on a panel on a smart card authentication apparatus in the third embodiment.

Smart card authentication apparatus 5001 displays the printing data information associated with user ID '3' received from each of the multifunction printers 5007 to 5010 in a list on its panel. The printing data information shown in FIG. 41, for example, is displayed on the panel 5100. One item of printing data is stored in MFP (A) 5007, one item of printing data is stored in MFP (B) 5008, two items of printing data are stored in MFP (C) 5009, and two items of printing data are stored in MFP (D) 5010. Each item of printing data was stored by the user with user ID '3'.

The user sees the screen, chooses the printing data information corresponding to the printing data he or she wishes to print, presses the corresponding one of six check buttons 5101 to 5106, and presses a print button 5110 to execute printing of the chosen printing data.

When the chosen printing data information and printing executing command are received from the smart card authentication apparatus 5001, the chosen multifunction printer executes printing of the chosen printing data.

The scheme for sending the user ID is not restricted to the above scheme in which smart card authentication apparatus 5001 sends the user ID to each of the multifunction printers 5007 to 5010 after user authentication. Smart card authentication apparatus 5001 may send the user ID only to a chosen multifunction printer. Alternatively, smart card authentication apparatus 5001 may send the user ID to the multifunction printers connected to the same network segment as smart card authentication apparatus 5001: in this example, to multifunction printers 5007 and 5008.

The authentication apparatus is not restricted to the smart card authentication apparatus used in the third embodiment. Different authentication apparatus may be used, such as the fingerprint authentication apparatus used in the second embodiment, or iris authentication apparatus for checking iris patterns.

The information processing system in the third embodiment enables the smooth execution of printing work, because when a user authenticated by the authentication apparatus chooses desired printing data which he or she has stored in one of the multifunction printers and prints the chosen printing data, only the printing data information stored by the user is displayed, and the user can choose the data to print, as described above.

The scheme for providing an authentication apparatus and an information processing apparatus is not restricted to the scheme in which one authentication apparatus and one information processing apparatus are provided as in the first embodiment. If a plurality of information processing apparatuses are connected, and an authentication apparatus includes a information processing apparatus selection processing unit 2203 (FIG. 22) as a smart card authentication apparatus 1709 as in the second embodiment, available information processing apparatuses may be displayed, and access control commands may be sent to the information processing apparatus chosen by the user.

The information processing apparatus is not restricted to image processing apparatus that includes the printing, scanning, facsimile, and networking functions noted in the first to third embodiments. The present invention may be used with other information processing apparatus such as personal computers (PCs), automatic teller machine (ATMs), and automobiles.

Those skilled in the art will recognize that further variations are possible within the scope of the invention, which is defined in the appended claims.

What is claimed is:

1. An information processing system comprising:
a plurality of information processing apparatuses that each have an information processing operation panel that is enabled or disabled, and functions for processing received information;
an input apparatus, connected to a network, being separate from each of the information processing apparatuses, the input apparatus being connected to each of the information processing apparatuses through the network, the input apparatus including
an input operation panel,
an operation panel control unit for controlling the input operation panel,
a user information input unit for input of user information that corresponds to a user, and
an apparatus selection unit for finding a usable information processing apparatus from among said information processing apparatuses by learning that the information processing operation panel of said usable information processing apparatus is disabled, the apparatus selection unit causing the operation panel control unit to display information about said usable information processing apparatus on the input operation panel and determining when the user selects said usable information processing apparatus from the input operation panel,
a control information transmitting unit for transmitting control information, based on available function information corresponding to the user information, to the user-selected information processing apparatus,
said usable information processing apparatus including
a control information receiving unit for receiving the control information, and
a function control unit for restricting use of one or more of the functions of said usable information processing apparatus according to the control information, wherein the one or more functions of said usable information processing apparatus include at least one of a printing function, a scanning function, a facsimile transmitting function and a facsimile receiving function; and
an authentication server for performing authentication, including
an authentication processing unit for performing an authentication process on the user information,
a function information selecting unit for selecting the available function information according to the user information, and
a function information transmitting unit for transmitting the available function information to the input apparatus.

2. The information processing system of claim 1, wherein the one or more functions of said usable information processing apparatus include several functions including a network access function.

3. The information processing system of claim 1, wherein the input apparatus also includes a storage unit for storing the available function information.

4. The information processing system of claim 1, wherein the input apparatus also includes
an authentication processing unit for performing authentication processing of the user information.

5. The information processing system of claim 1, wherein the input apparatus also includes a command generator for generating the control information from the available function information, the control information including commands that are analyzed by the information processing apparatus.

6. The information processing system of claim 1, further wherein
the input apparatus includes a user information transmitting unit for transmitting the user information, and a function information receiving unit for receiving the available function information, and
the authentication server includes a user information receiving unit for receiving the user information.

7. The information processing system of claim 1, wherein the control information receiving unit includes an apparatus recognition unit for recognizing the input apparatus that sent the control information.

8. The information processing system of claim 1, wherein the user information input unit is a smart card reader.

9. The information processing system of claim 1, wherein the user information input unit is a fingerprint reader.

10. An input apparatus separate from and connected to a plurality of information processing apparatuses each having an information processing operation panel that is enabled or disabled, the input apparatus and the information processing apparatuses each being connected to each other through a network, the input apparatus comprising:
an input unit for input of user information that corresponds to a user;
an input operation panel;
an operation panel control unit for controlling the input operation panel;
an apparatus selection unit for finding a usable information processing apparatus from the information processing apparatuses through the network by learning that the information processing operation panel of said usable information processing apparatus is disabled, the apparatus selection unit causing the operation panel control unit to display information about said usable information processing apparatus on the input operation panel and determining when the user selects said usable information processing apparatus from the input operation panel;
a first transmitting unit for transmitting control information to the user-selected information processing apparatus, the control information being based on available function information corresponding to the user information, the available function information indicating available functions of the user-selected information processing apparatus and including at least one of a printing function, a scanning function, a facsimile transmitting function and a facsimile receiving function; and
an authentication processing unit for performing authentication processing on the user information.

11. The input apparatus of claim 10, further comprising a selecting unit for selecting the available function information according to the user information.

12. The input apparatus of claim 10, further comprising a command generator for generating the control information from the available function information, the control information including commands that are analyzed by the information processing apparatus.

13. The input apparatus of claim 10, wherein the input apparatus is also connected to an authentication server for performing authentication of the user information and selecting the available function information according to the user information, the input apparatus further comprising:
a second transmitting unit for transmitting the user information to the authentication server; and
a receiving unit for receiving the available function information from the authentication server.

14. An information processing system comprising:
an input apparatus, connected to a network, that includes
a user information input unit for input of user information that corresponds to a user,
a first information transmitting unit for transmitting the user information,
a first information receiving unit for receiving searched processing data information,
an operation panel for displaying a list of the searched processing data information, and allowing for an input by the user to choose one of the searched processing data information from the list,
a second information transmitting unit for transmitting the chosen processing data information, and
an authentication processing unit for performing user authentication on the user information; and
an information processing apparatus separate from the input apparatus and connected to the input apparatus through the network, the information processing apparatus having functions for processing received information, available ones of the functions being determined from the user information and including at least one of a printing function, a scanning function, a facsimile transmitting function and a facsimile receiving function, the information processing apparatus including
 a first information receiving unit for receiving the user information from the first information transmitting unit of the input apparatus,
 a data storage unit for storing a plurality of processing data,
 an information searching unit that determines the searched processing data information by searching the processing data of the data storage unit according to the user information,
 a data transmitting unit for transmitting the searched processing data information to the first information receiving unit of the input apparatus,
 a second information receiving unit for receiving the chosen processing data information from the second information transmitting unit,
 a data selecting unit for selecting one of the processing data from the data storage unit according to the chosen processing data information, and
 a data processing unit for processing the selected processing data.

15. The information processing system of claim 14, including a plurality of information processing apparatuses wherein said information processing apparatus is one of the plurality of information processing apparatuses.

16. The information processing system of claim 7, wherein the recognition unit determines whether the input apparatus is authorized to send the control information to the information processing apparatus, and when the input apparatus is authorized causes the function control unit to restrict the use of the one or more functions of the information processing apparatus according to the control information.

\* \* \* \* \*